(12) United States Patent
Kiyota

(10) Patent No.: US 10,564,486 B2
(45) Date of Patent: Feb. 18, 2020

(54) LIQUID CRYSTAL DISPLAY AND METHOD FOR MANUFACTURING THE SAME

(71) Applicant: Mitsubishi Electric Corporation, Tokyo (JP)

(72) Inventor: Kazushi Kiyota, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/945,831

(22) Filed: Apr. 5, 2018

(65) Prior Publication Data
US 2018/0314097 A1   Nov. 1, 2018

(30) Foreign Application Priority Data
Apr. 28, 2017   (JP) .................................. 2017-089913

(51) Int. Cl.
| G02F 1/1339 | (2006.01) |
| G02F 1/1337 | (2006.01) |
| G02F 1/1368 | (2006.01) |
| G02F 1/1341 | (2006.01) |
| G02F 1/1333 | (2006.01) |
| G02F 1/1335 | (2006.01) |
| G02F 1/1345 | (2006.01) |

(52) U.S. Cl.
CPC ........ G02F 1/13394 (2013.01); G02F 1/1337 (2013.01); G02F 1/1339 (2013.01); *G02F 1/1341* (2013.01); *G02F 1/1368* (2013.01); *G02F 1/13452* (2013.01); *G02F 1/133351* (2013.01); *G02F 1/133528* (2013.01); *G02F 1/133784* (2013.01); *G02F 2001/13396* (2013.01); *G02F 2001/13398* (2013.01); *G02F 2001/13415* (2013.01)

(58) Field of Classification Search
CPC .................................................. G02F 1/13394
See application file for complete search history.

(56) References Cited

U.S. PATENT DOCUMENTS

| 2013/0301105 A1* | 11/2013 | Kim ..................... G02B 26/005 359/290 |
| 2014/0028942 A1* | 1/2014 | Takeuchi .......... G02F 1/136227 349/43 |
| 2014/0132901 A1* | 5/2014 | Kim .................. G02F 1/133753 349/129 |
| 2015/0346556 A1* | 12/2015 | Hirota ................... G02F 1/1339 349/43 |
| 2017/0052405 A1* | 2/2017 | Yu ........................ H05K 999/99 |

FOREIGN PATENT DOCUMENTS

| JP | 2007-304452 A | 11/2007 |
| JP | 2011-186026 A | 9/2011 |

* cited by examiner

*Primary Examiner* — Edmond C Lau
(74) *Attorney, Agent, or Firm* — Studebaker & Brackett PC

(57) ABSTRACT

Provided is a liquid crystal display that achieves both reliability and a narrowed-down frame at a relatively high level. In a liquid crystal display according to an aspect of the present invention, alignment films are disposed on a surface of an array substrate and a surface of a counter substrate. The alignment films are each disposed in a display region and each have an overlap with part of the inside of a sealant. The surfaces of the substrates in the overlaps each have an uneven surface. All over an outer edge portion of the sealant, a portion is disposed in which the sealant is joined to the surfaces of the individual substrates without the alignment films interposed therebetween.

17 Claims, 13 Drawing Sheets

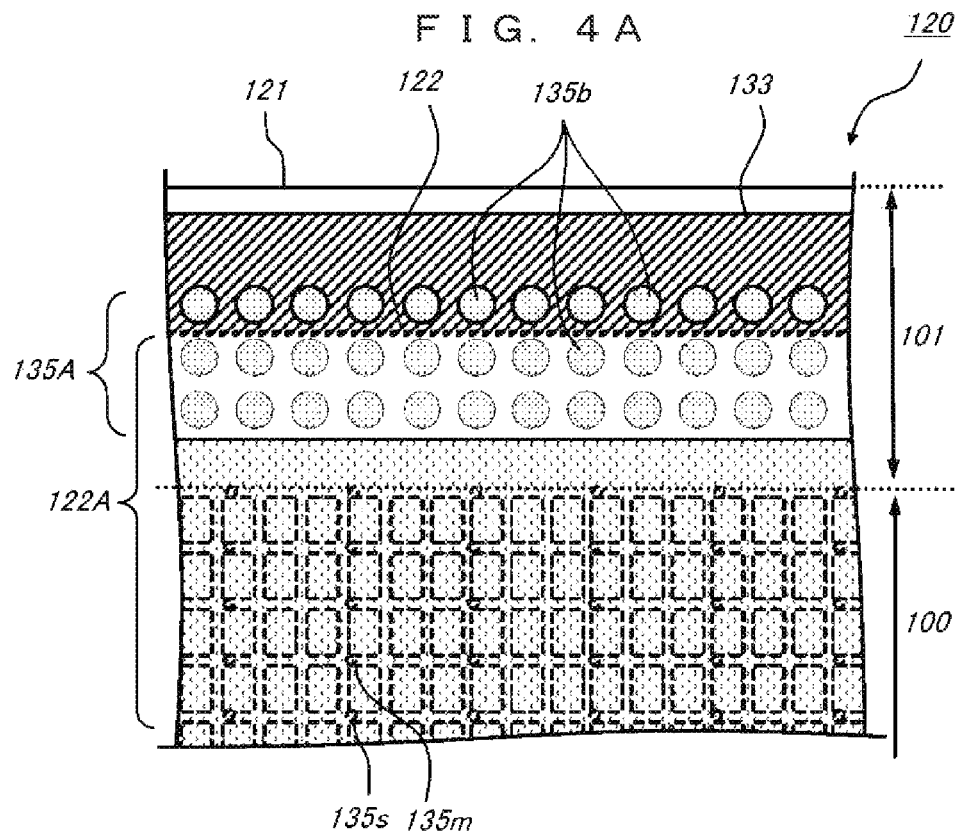
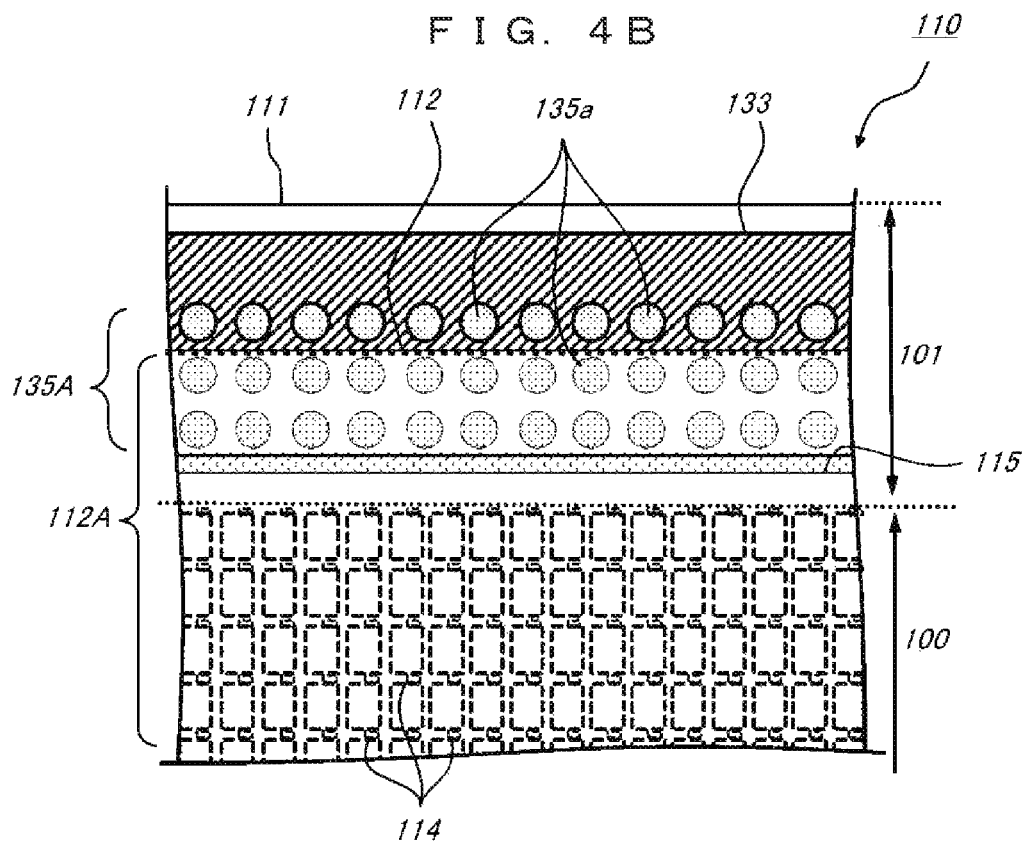

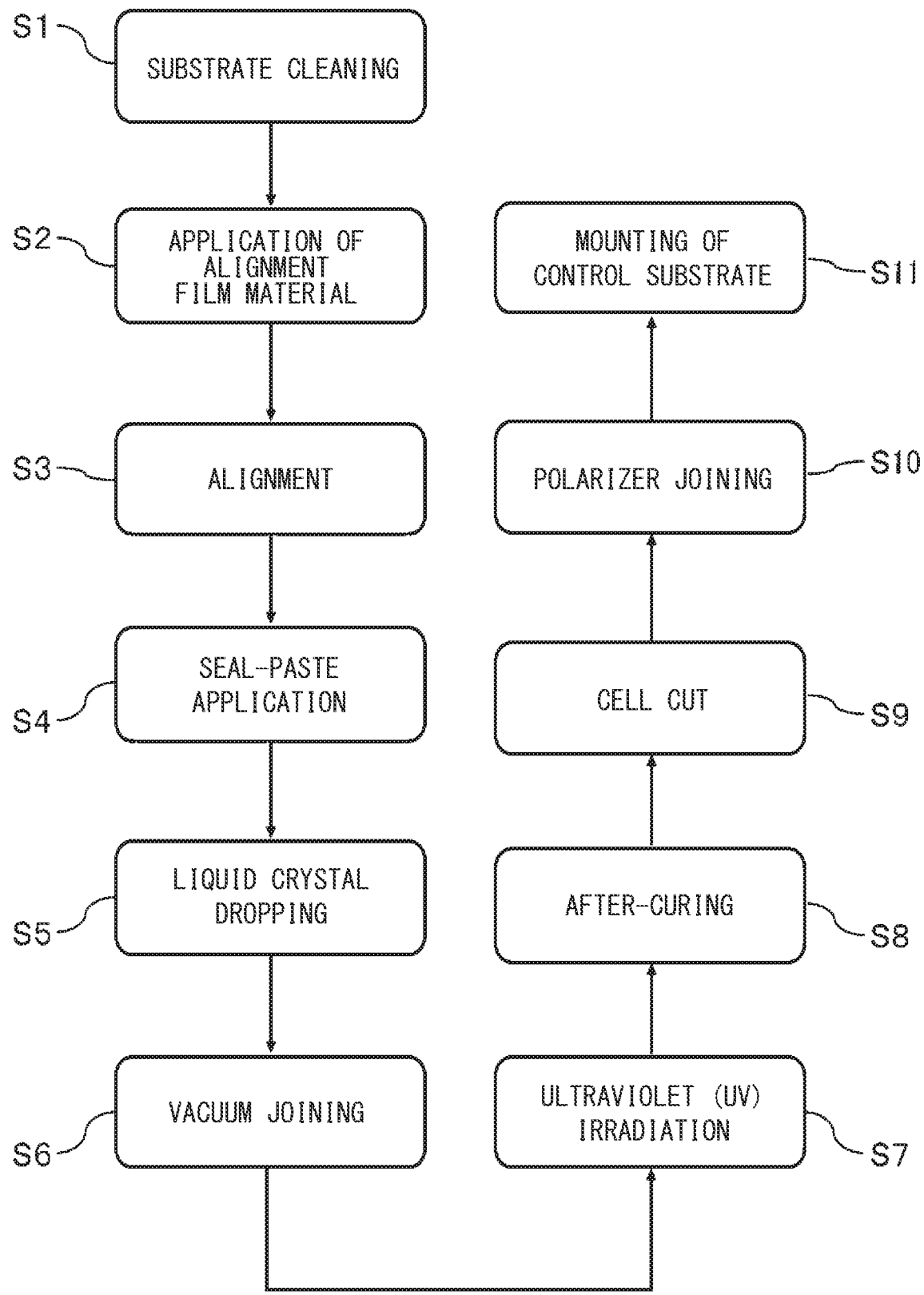

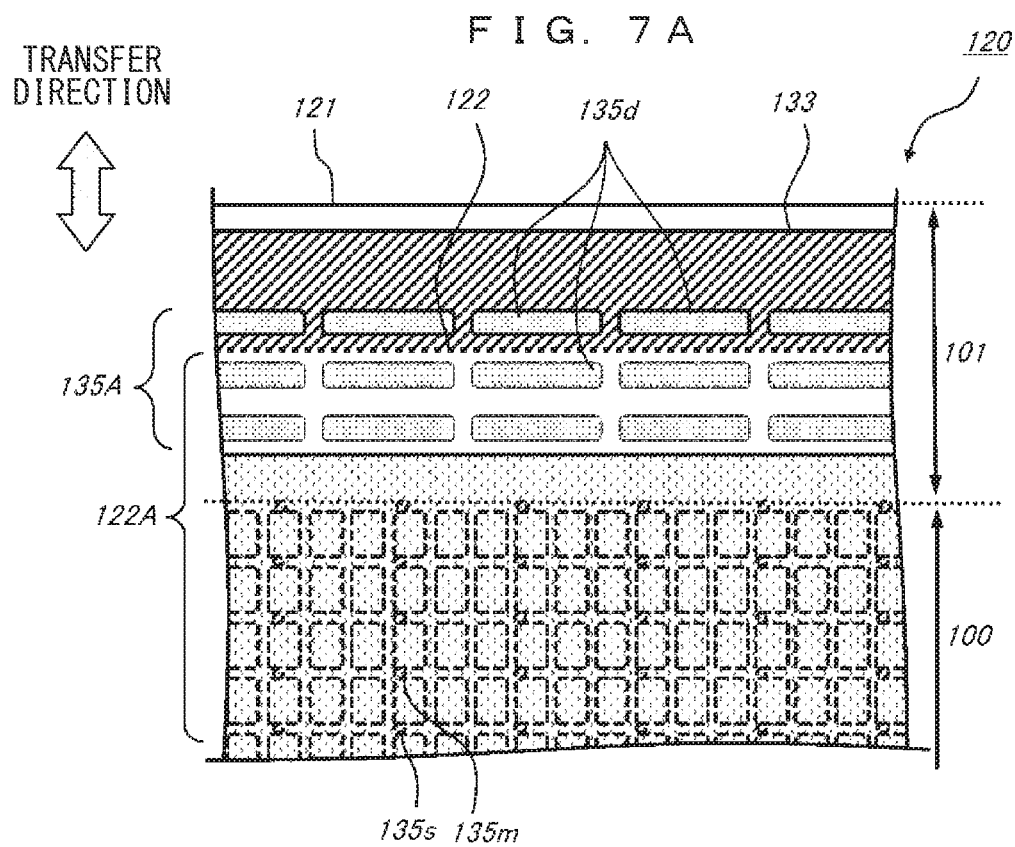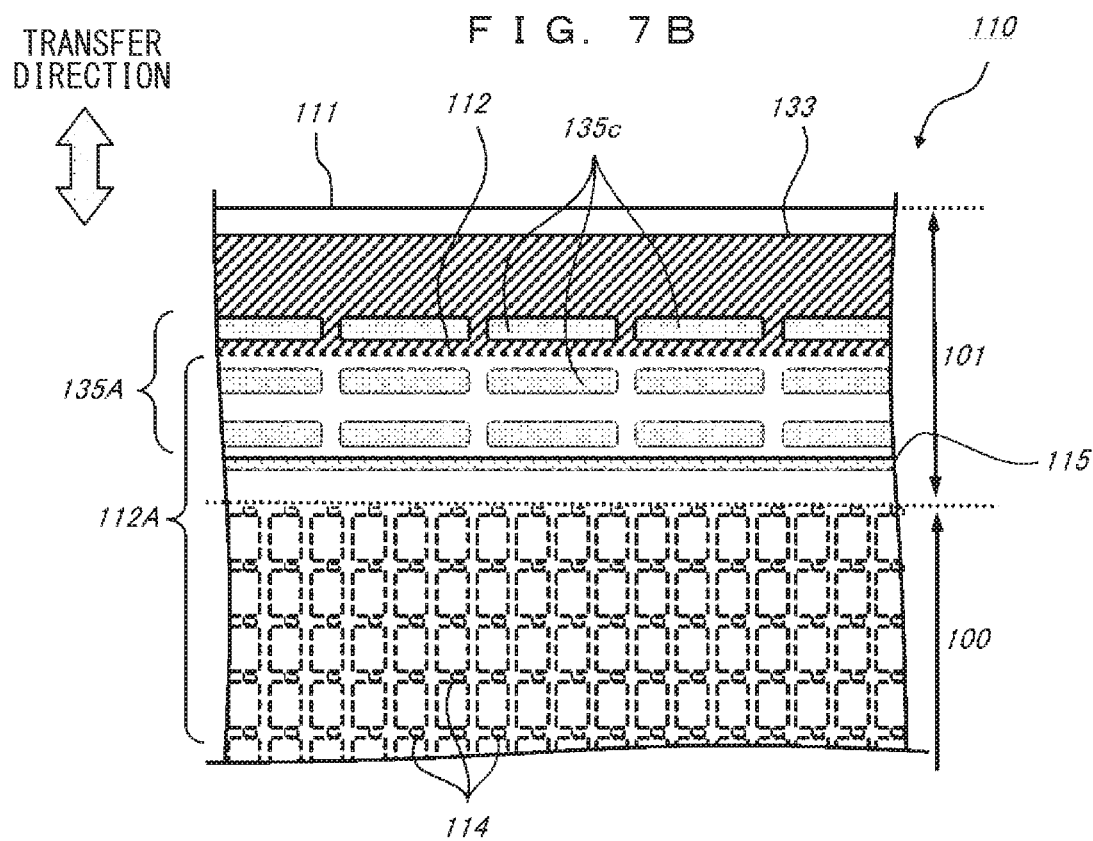

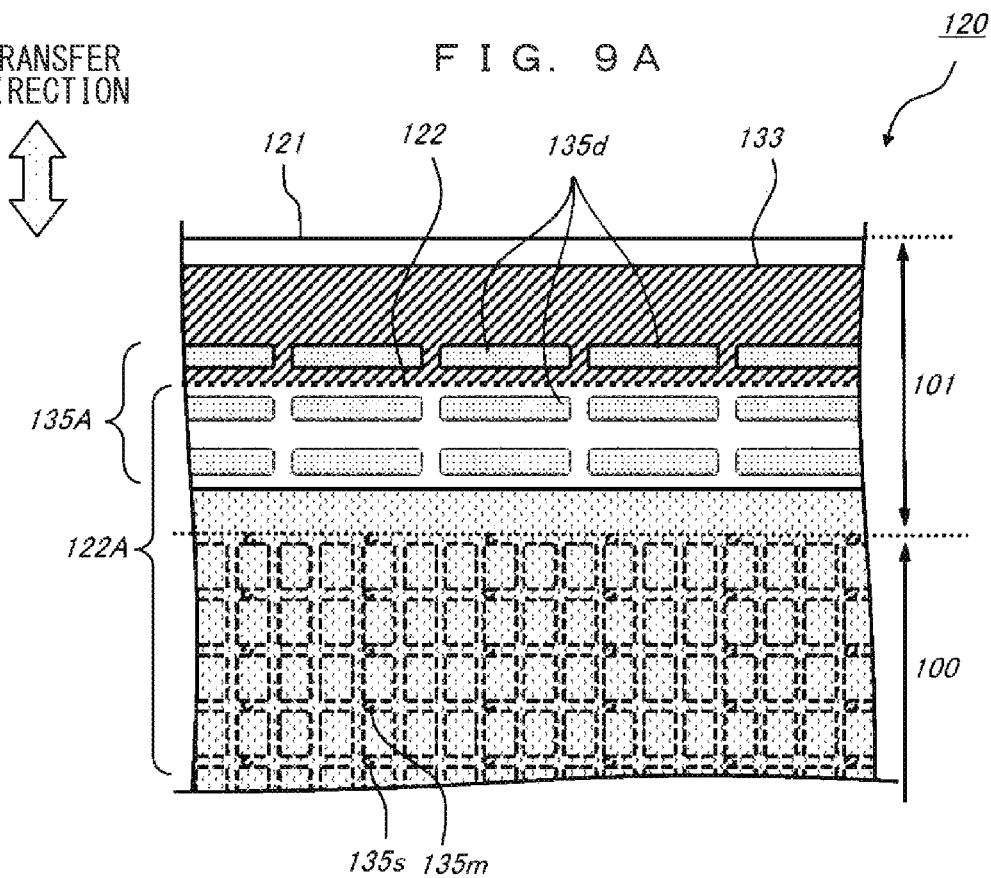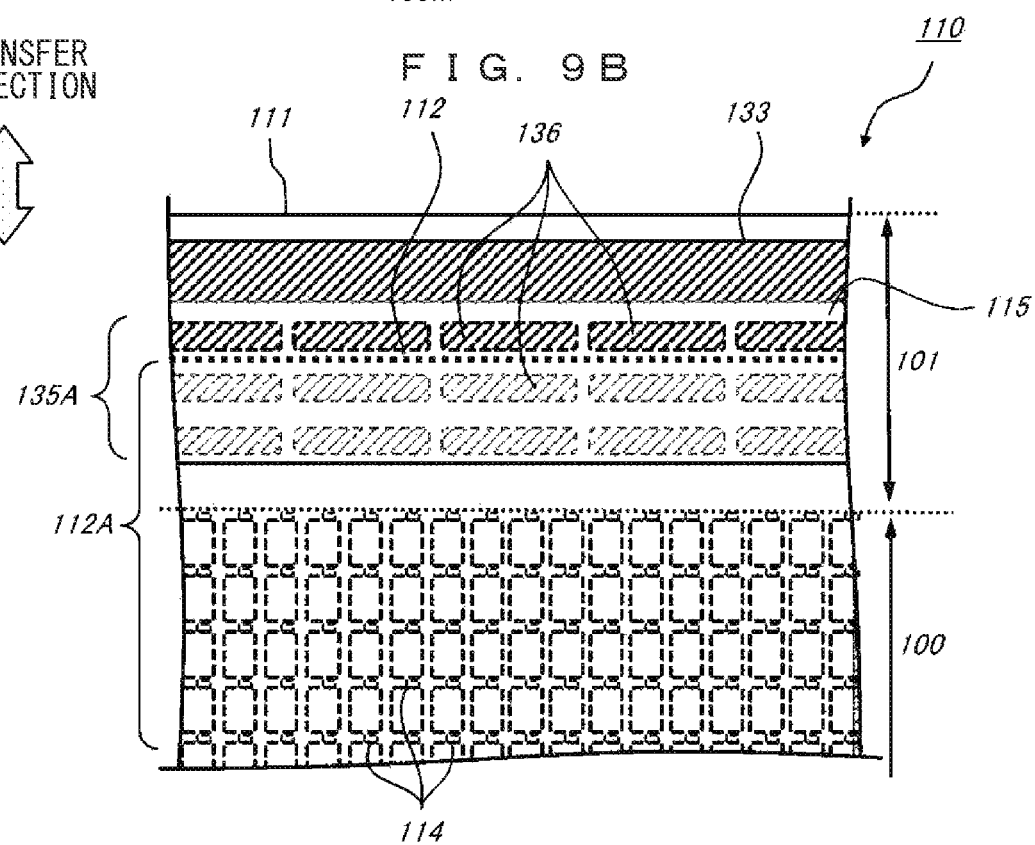

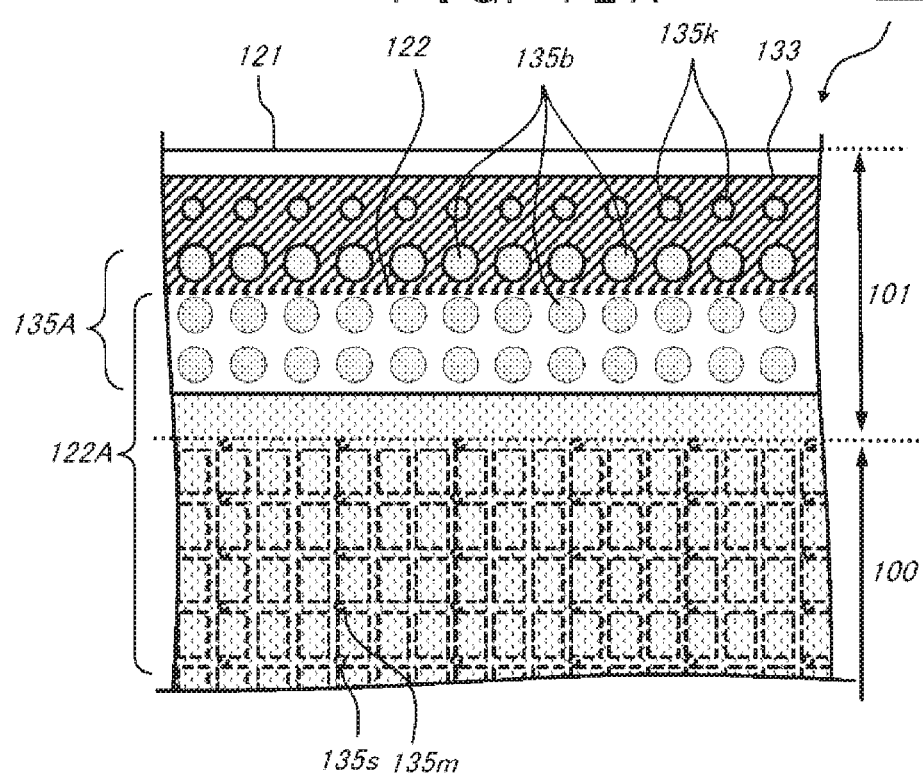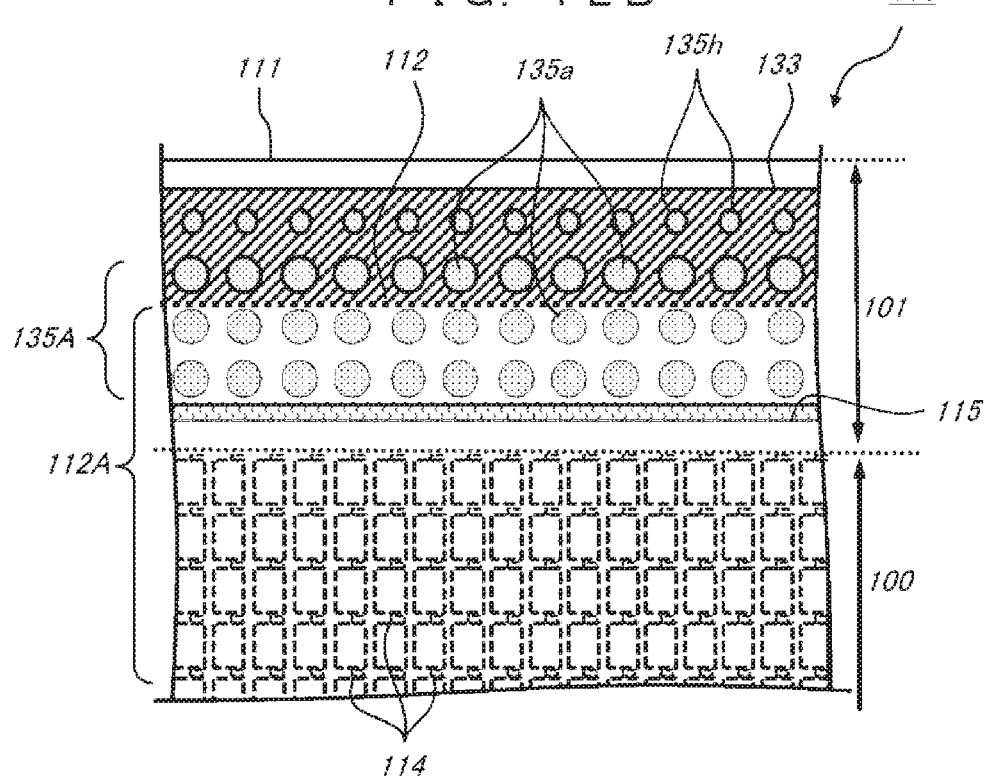

LIQUID CRYSTAL DISPLAY AND METHOD FOR MANUFACTURING THE SAME

BACKGROUND OF THE INVENTION

Field of the Invention

The present invention relates to liquid crystal displays, and particularly, to a liquid crystal display that includes a sealant joining substrates together, and alignment films disposed on surfaces of the substrates.

Description of the Background Art

A narrowed-downs frame of the liquid crystal display requires a reduction in width of the sealant. The reduction involves a decrease in area in which the sealant is joined to the substrate. Hence, weakened adhesion (joining strength) between the sealant and the substrate unfortunately causes sealant detachment. The sealant detachment is accompanied by a reduction in reliability of the liquid crystal display. Meanwhile, when the sealant overlaps an alignment film region, the sealant is joined to the substrate with the alignment film interposed therebetween in the overlap. Further, a joining strength between the alignment film and the substrate is commonly weaker than a joining strength between the sealant and the substrate. Hence, an increase in the overlap between the alignment film and the sealant causes weakened adhesion of the sealant, thereby unfortunately resulting in the sealant detachment. The sealant detachment involves the reduction in reliability.

When putting emphasis on the reliability, a user needs to design the sealant and the alignment film so as not to basically overlap each other while allocating margins including width variations and positional deviations of the sealant as well as positional deviations of an alignment-film formation region, and the user also needs to design the width of the sealant in such a manner that the sealant has sufficient adhesion in view of the width variations. As a result, a sealant formation region cannot be close to a display region to more than a certain degree, and the sealant formation region needs to be designed to have more than a certain width. Unfortunately, this hinders the narrowed-down frame.

For instance, Japanese Patent Application Laid-Open No. 2007-304452 provides a technique for both the narrowed-down frame and a sufficient joining strength of a sealant. This document discloses a configuration in which an alignment film extends to the outside of a sealant formation region, and the sealant formation region is provided with a structure eliminating the alignment film in order to prevent a reduction in adhesion caused by the fact that the alignment film overlaps the sealant.

However, in the configuration of Japanese Patent Application Laid-Open No. 2007-304452, the alignment film and the structure are provided to reach the outer edge portion of the sealant. Unfortunately, this can cause moisture to penetrate a cell by way of the alignment film between the sealant and a substrate or of the inside of the structure. In other words, this configuration can be less resistant to moisture. Further, the aforementioned document describes that the structure eliminating the alignment film, which has a low affinity for the alignment film, is capable of eliminating the alignment film. To actually achieve such a function, however, the structure needs to contain a particular material that has a low affinity for the alignment film and a high affinity for the sealant. To satisfy this need, Japanese Patent Application Laid-Open No. 2007-304452 describes that specific examples of the structure include an overcoat layer disposed on a color filter substrate and a TFT substrate including an organic resin film that is used as a flattening film. A typical organic resin film such as an acrylic film that is contained in the overcoat layer and the TFT substrate has no such property as mentioned above. The document fails to disclose any other specific material that meets this condition. Accordingly, Japanese Patent Application Laid-Open No. 2007-304452 fails to disclose any practical solutions.

SUMMARY

The present invention provides a liquid crystal display that achieves both reliability and a narrowed-down frame at a relatively high level by the use of a material used in a typical liquid crystal display or by any practically possible means. The present invention also provides a method for manufacturing such a liquid crystal display.

Alignment films are disposed on a surface of an array substrate and a surface of a counter substrate. The alignment films are each disposed in a display region and each have an overlap with part of the inside of a sealant. The surfaces of the substrates in the overlaps each have an uneven surface. All over an outer edge portion of the sealant, a portion is disposed in which the sealant is joined to the surfaces of the individual substrates without the alignment films interposed therebetween.

The liquid crystal display archives both reliability and a narrowed-down frame at a relatively high level.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are plan views of main parts of a color filter substrate and an array substrate of the liquid crystal display according to the first preferred embodiment of the present invention;

FIG. 5 is a flowchart of panel assembly in a method for manufacturing the liquid crystal panel according to the first preferred embodiment of the present invention;

FIGS. 7A and 7B are plan views of main parts of a color filter substrate and an array substrate of a liquid crystal display according to a first preferred embodiment of the present invention;

FIGS. 9A and 9B are plan views of main parts of a color filter substrate and an array substrate of a liquid crystal display according to a third preferred embodiment of the present invention;

FIGS. 12A and 12B are plan views of main parts of a color filter substrate and an array substrate of a liquid crystal display according to a first modification of a fifth preferred embodiment of the present invention.

DESCRIPTION OF THE PREFERRED EMBODIMENTS

First Preferred Embodiment

Figure 1:
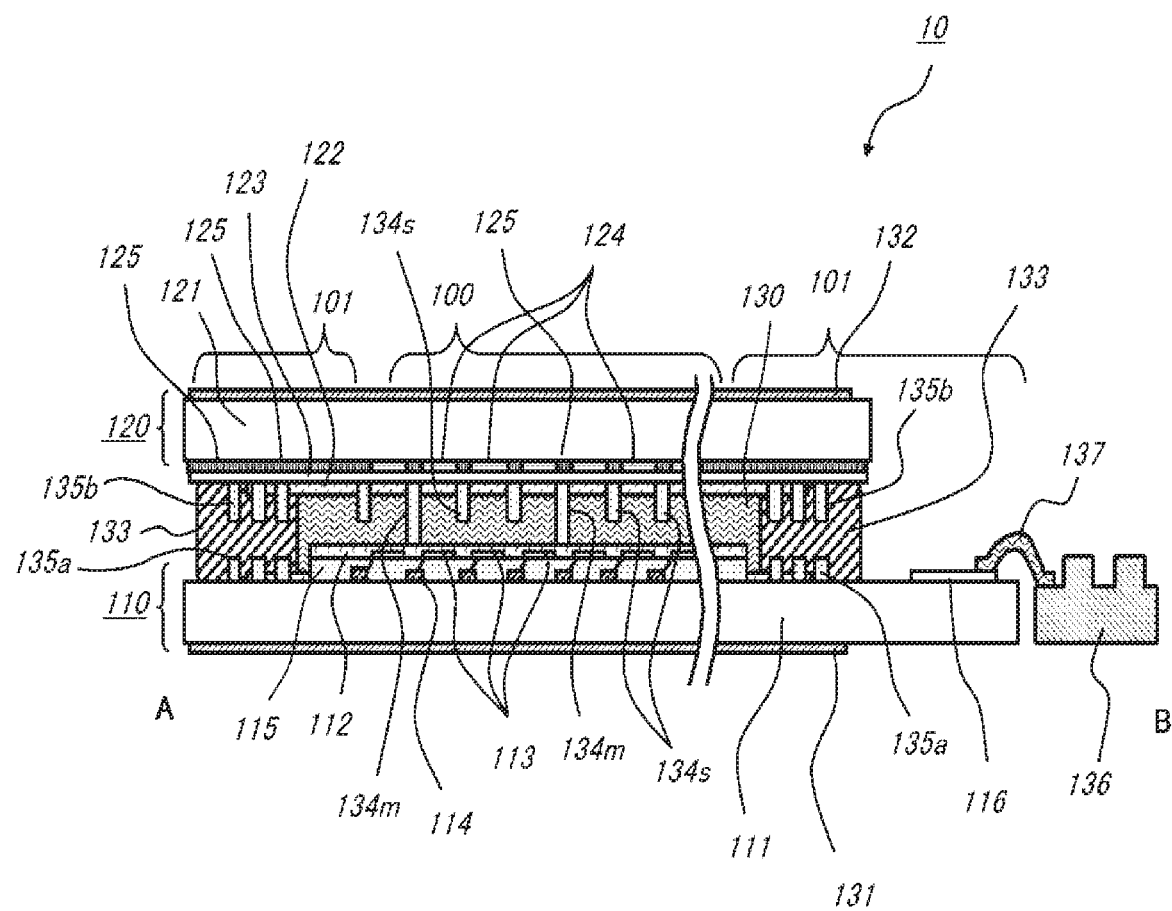
FIG. 1 is a cross-sectional view of a liquid crystal panel of a liquid crystal display according to a first preferred embodiment of the present invention.
Figure 2:
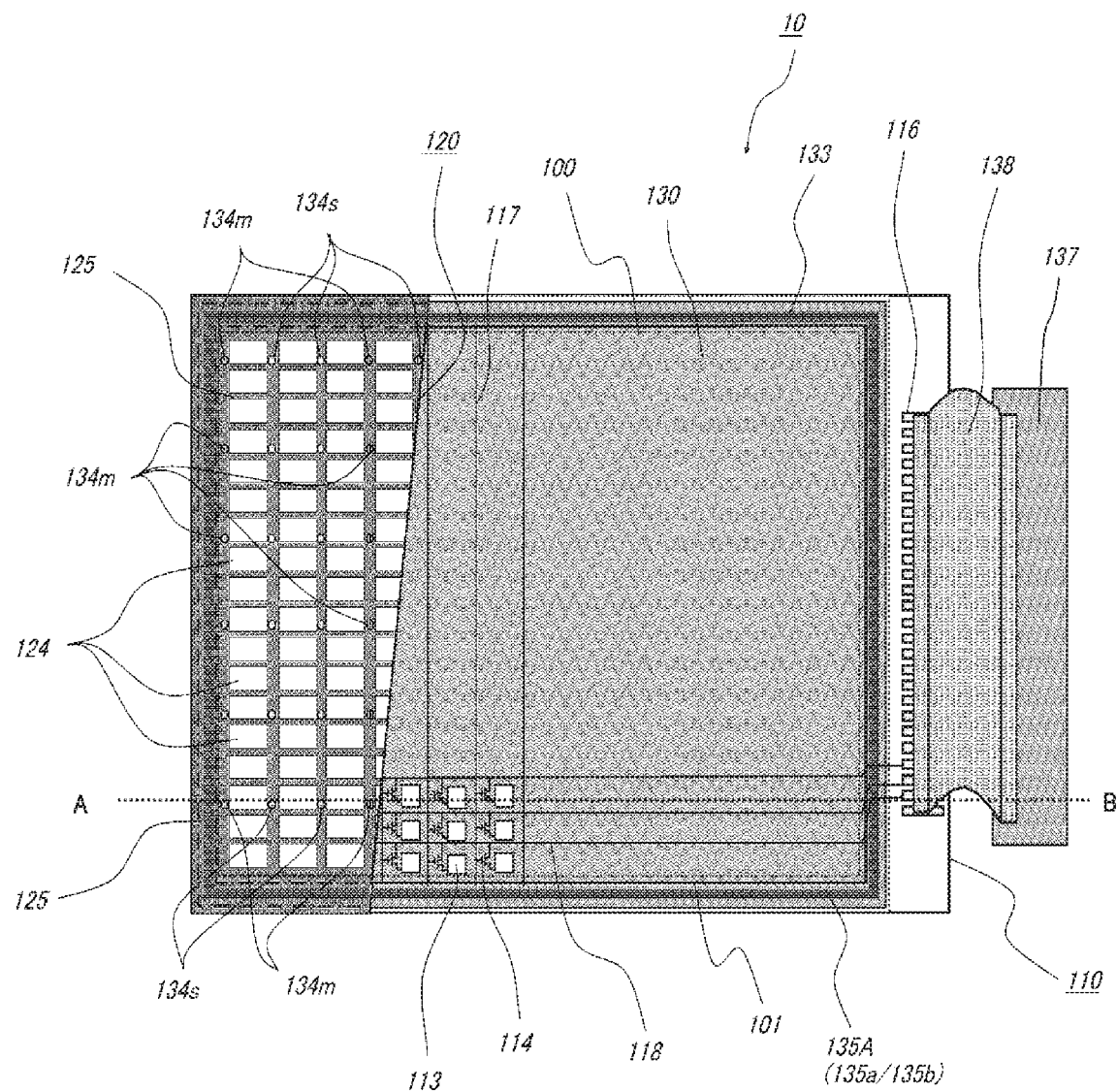
FIG. 2 is a plan view of the liquid crystal panel of the liquid crystal display according to the first preferred embodiment of the present invention.
Figure 3A:
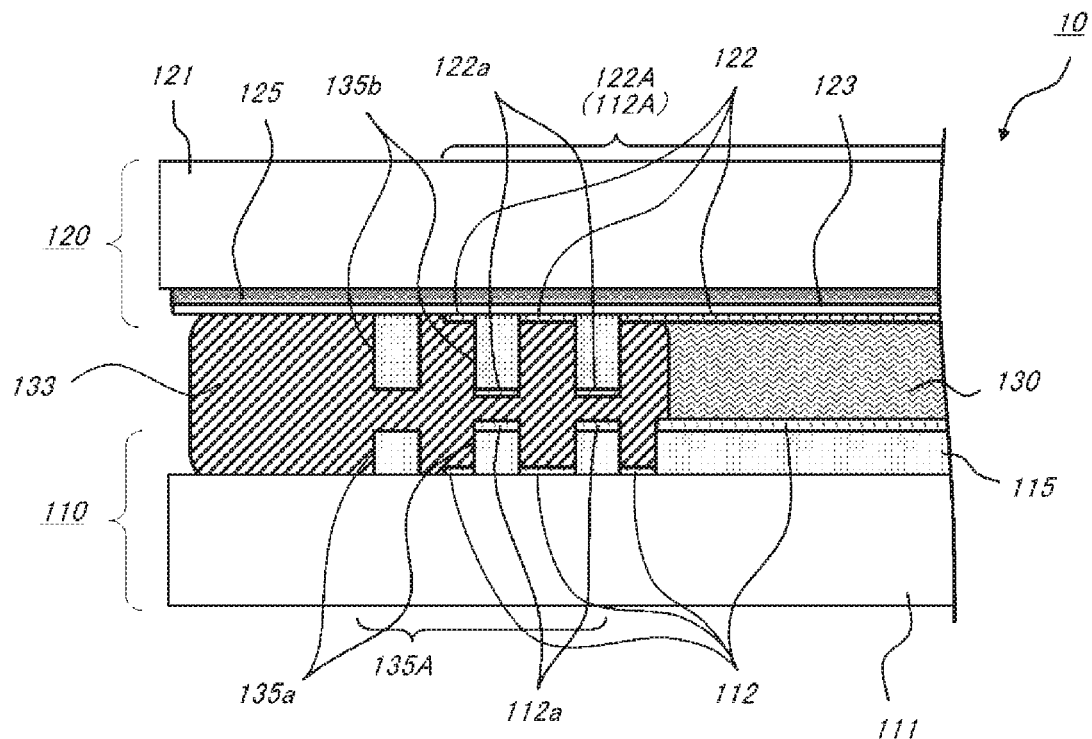
FIGS. 3A and 3B are cross-sectional views of main parts of the liquid crystal panel of the liquid crystal display according to the first preferred embodiment of the present invention.
Figure 3B:
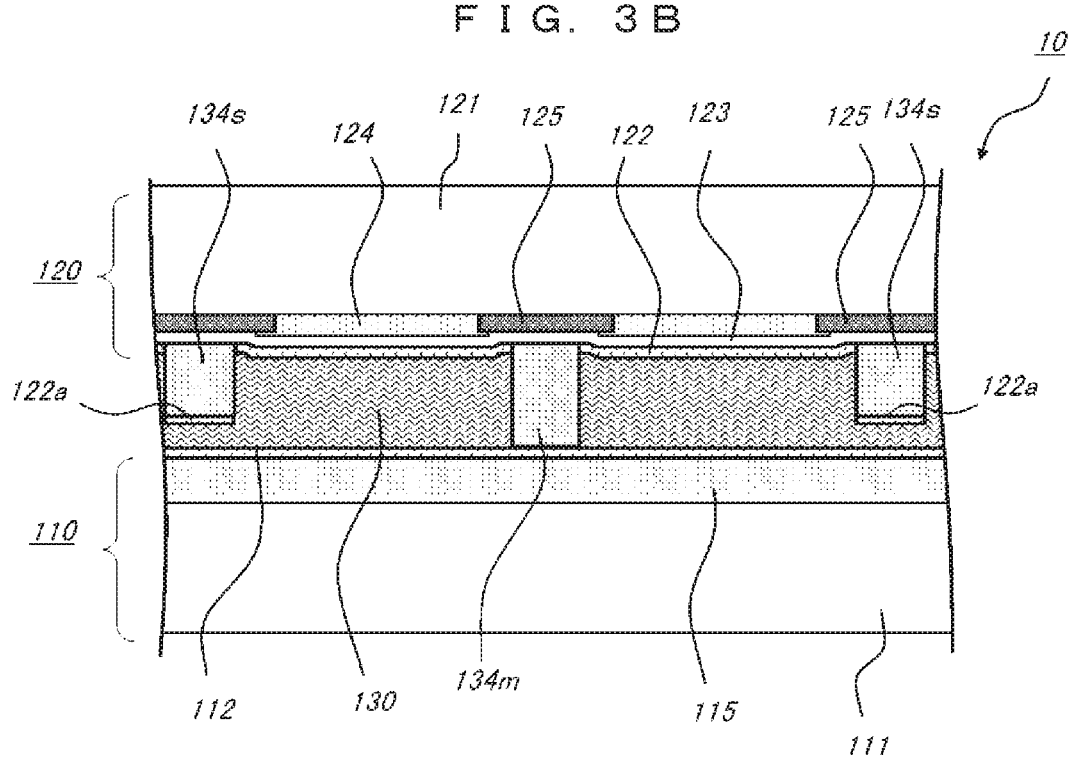

The following describes a configuration of a liquid crystal panel 10 included in a liquid crystal display according to a first preferred embodiment with reference to FIGS. 1, 2, 3A, 3B, 4A, and 4B. FIG. 1 is a cross-sectional view of the entire configuration of the liquid crystal panel; and FIG. 2, a plan view of the same. FIG. 1 is a cross-sectional view taken along line A-B in FIG. 2. FIGS. 3A and 3B are detailed cross-sectional views of main parts of the invention. FIG. 3A is a cross-sectional view of a frame region. FIG. 3B is a cross-sectional view of a display region. FIGS. 4A and 4B are detailed views of the main parts of the invention. FIG. 4A is a plan view of a CF substrate. FIG. 4B is a plan view of an array substrate.

It is to be noted that the drawings are schematic and do not reflect the exact sizes of components provided herein. For purposes of illustration, components between the CF substrate and the array substrate, in particular, are illustrated so that the distance between each substrate and each component is large and the length of each component in a direction perpendicular to a surface of each substrate is long when compared to the thickness of each substrate. Further, for simple drawings, some components other the main part of the invention are not illustrated, and others are not detailed. The remaining drawings will be provided in the same manner. Still further, identical symbols denote identical components between the different drawings, and the description of the identical components will not be elaborated.

Described herein is the liquid crystal panel that includes a liquid crystal that operates in a twisted nematic (TM) mode, and a thin film transistor (TFT), which is a switching element. The liquid crystal panel included in this liquid crystal display may have any other configuration. The operational mode of the liquid crystal is not limited to the TN mode. In some embodiments, the liquid crystal operates in super twisted nematic (STN) mode or a ferroelectric liquid crystal mode. In other embodiments, the liquid crystal operates in a transverse electric-field mode in which an electric field is transversely applied to the surfaces of the substrates, thereby operating the liquid crystal. The switching element is not limited to the TFT. In some embodiments, the switching element is a diode or any other element.

The liquid crystal panel 10 includes the following: an array substrate, which in this embodiment is a TFT array substrate (hereinafter referred to as an array substrate) 110 on which switching elements such as TFTs and pixel electrodes are arraigned in array; a counter substrate, which in this embodiment is a color filter substrate (hereinafter referred to as a CF substrate) 120 facing the array substrate 110; and a sealant 133 surrounding a region corresponding to a display region 100 and sealing a gap between the CF substrate 120 and the array substrate 110. The liquid crystal panel 10 also include a liquid crystal layer 130 sealed with the sealant 133 and held in a region in a gap between the CF substrate 120 and the array substrate 110, the region corresponding at least to the display region 100. Accordingly, the sealant 133 is disposed in a frame region 101 surrounding, like a frame, the outside of the region corresponding to the display region 100.

The array substrate 110 and the CF substrate 120 each have a rectangular outer shape. The outer shape of the array substrate 110 is larger than the outer shape of the CF substrate 120. The array substrate 110 has a protrusion partly protruding from an end surface of the outer shape of the CF substrate 120, and overlaps the CF substrate 120.

Reference is made to the plan view of FIG. 2. For purposes of illustrating the configuration of the array substrate 110 disposed under the CF substrate 120, only a part of the upper-left side of the drawing illustrates the CF substrate 120, and the remaining part of the thawing illustrates not the CF substrate 120, but a configuration of the array substrate 110. The CF substrate 120 actually is provided to reach a region indicated by a broken line of the drawing, the region being located outside a region surrounded by the sealant 133.

In the drawing, a rectangular region that is the display region 100 is surrounded with a dotted line, so that the dotted line is a border between the frame region 101 and the display region 100. It is to be noted that throughout the Specification, the frame region 101 means a frame-like region surrounding the display region 100 and positioned outside the display region 100, on the array substrate 110 of the liquid crystal panel 10, on the CF substrate 120 of the liquid crystal panel 10, and in a region of the liquid crystal display 10, between both substrates. In other words, the frame region 101 herein means the whole region of the liquid crystal panel 10 except the display region 100. It is also to be noted that throughout the Specification, the display region 100 means a whole region including a region on array substrate 110 of the liquid crystal panel 10, a region on the CF substrate 120 of the liquid crystal panel 10, and a region of the liquid crystal panel 10, between both substrates. It is to be noted that the frame region 101, although its actual size and width are not reflected in the drawing, is designed to have a narrower width and a narrower frame than a conventional, typical liquid crystal display. This is one of the features of the liquid crystal panel 10 according to the first preferred embodiment.

Arranged between the array substrate 110 and the CF substrate 120, in the display region 100 are a plurality of columnar spacers forming and holding a predetermined range of a gap between substrates (i.e., keeping the distance between the substrates within a certain range). In the first preferred embodiment, the liquid crystal display has a dual-spacer structure in which the columnar spacers are formed of two different kinds of spacers: one having a relatively high height (or a relatively long length in a direction perpendicular to a surface of each substrate); and the other having a relatively low height (or a relatively short length in the direction perpendicular to the surface of each substrate). The former spacers normally abut the substrates facing each other and maintaining the distance between the substrates (theses spacers are referred to as main spacers). The latter spacers do not normally abut the substrates facing each other and do not maintain the distance between the substrates, and the latter spacers abut the substrates and maintain the distance only when the distance between the substrates is reduced due to an external force or other factors (these spacers are referred to as sub-spacers).

Accordingly, the columnar spacers in the first preferred embodiment are formed of two different kinds of spacers: one is columnar spacers 134m that are main spacers (hereinafter referred to as main spacers 134m); and the other is columnar spacers 134s that are sub-spacers (hereinafter referred to as sub-spacers 134s). The main spacers 134m are each formed of, for instance, a photosensitive acrylic film having a thickness of the order of 3 µm, the thickness corresponding to the distance between the substrates. The sub-spacer 134s are each formed of, for instance, a photosensitive acrylic film having a thickness of the order of 2 µm so as to be thinner than the main spacers 134m. It is to be noted that in the cross-sectional views of FIGS. 1, 2, 3A, and 3B, no external pressure is applied to the surfaces of the array substrate 110 and CF substrate 120 of the liquid crystal panel 10; that is, a substrate interval is a predetermined interval (cell gap value). With no external pressure, the main spacers 134m abut both the array substrate 110 and the CF substrate 120; and the sub-spacers 134s, only CF substrate 120.

Arranged in a formation region of the sealant 133 in the frame region 101, are a plurality of projection patterns 135b made of the same material and having the same thickness as the sub-spacers 134s (i.e., each projection pattern 135b has the same length in the direction perpendicular to the surface of each substrate as the sub-spacer 134s, or a surface of each projection pattern 135b in the perpendicular direction is flush with a surface of each sub-spacer 134s). The projection patterns 135b are each a characteristic component, and thus will be detailed later on.

The liquid crystal layer 130 is sealed by the sealant 133, and is held in the gap between the CF substrate 120 and the array substrate 110, which are held by the main spacers 134m and the sub-spacers 134s, the gap being located in a region corresponding at least to the display region 100.

The array substrate 110 includes the following: an alignment film 112 aligning liquid crystals on one of the surfaces of a transparent substrate, which in this embodiment is a glass substrate 111; pixel electrodes 113 disposed under the alignment film 112 and across which a voltage for driving the liquid crystals is applied; switching elements, which in this embodiment are TFTs 114, supplying the voltage to the pixel electrodes 113; an insulating film 115 covering the TFTs 114; a plurality of gate wires 117 and a plurality of source wires 118, the gate wires 117 and the source wires 118 supplying signals to the TFTs 114; terminals 116 externally receiving the signals, which are supplied to the TFTs 114; transfer electrodes (not shown) through which the signals, which are received from the terminals 116, are transferred to the CF substrate 120; peripheral wires (not shown) through which the signals, which are received from the terminals 116, are transferred to the gate wires 117, the source wires 118, and the transfer electrodes; and other components.

It is to be noted that the insulating film 115 is at least partly formed of an organic resin film (to be specific, a photosensitive acrylic resin having a thickness of the order of 1 to 3 µm and serves, in the display region 100, as a flattening film flattening the surface of the substrate on the TFT 114. It is also to be noted that the insulating film 115, which is a flattening film, is preferably an application insulating film made of an inorganic material such an SOG film. Further, arranged in the formation region of the sealant 133 in the frame region 101 are a plurality of projection patterns 135a formed of an organic resin film, in the same manner as the insulating film 115. The projection patterns 135a are each a characteristic component, and thus will be detailed later on.

The TFTs 114, detailed configuration of which will not be elaborated here, are disposed in the vicinity of individual intersections between the gate wires 117 and the source wires 118, both of which are lengthwise and widthwise arranged, as illustrated in FIG. 2. The pixel electrodes 113 are arranged in matrix within individual pixel regions surrounded by the gate wires 117 and the source wires 118. The terminals 116, the transfer electrodes, and the peripheral wires are disposed in the frame region 101. The other surface of the glass substrate 111 is provided with a polarizer 131.

The CF substrate 120 includes the following: an alignment film 122 aligning liquid crystals on one of the surfaces of a transparent substrate, which in this embodiment is a glass substrate 121; a common electrode 123 disposed under the alignment film 122 and producing an electric field between the pixel electrodes 113 and the common electrode 123 to drive the liquid crystals; a plurality of color filters 124 arranged under the common electrode 123; a light-blocking layer, which in this embodiment is a black matrix (BM) 125, and blocking light between the color filters 124 or blocking light in the frame region 101, which is disposed outside the region corresponding to the display region 100; and other components. A polarizer 132 is disposed on the other surface of the glass substrate 121 of the CF substrate 120, i.e., on a surface opposite the one surface on which the color filters 124, the BM 125, and other components.

It is to be noted that although in the cross-sectional view of FIG. 1, the alignment film 122 on the surface of the CF substrate 120 is disposed in a region of the display region 100 except where the main spacers 134m and the sub-spacers 134s are disposed, and disposed in a region of the frame region 101 except where the projection patterns 135b are disposed, and particularly disposed in a region mainly inside the formation region of the sealant 133, an alignment film material that forms the alignment film 122 is applied after the formation of the main spacers 134m, the sub-spacers 134s, and the projection patterns 135b; accordingly, the alignment film material is applied also to surfaces of the main spacers 134m, surfaces of the sub-spacers 134s, and surfaces of the projection patterns 135b. Nevertheless, since the alignment film material on these surfaces is per se formed to be relatively thin, the alignment film 122 on theses surfaces is not shown in the cross-sectional view of FIG. 1. Likewise, with regard to the alignment film 112 on the surface of the array substrate 110, the alignment film 112 on the surfaces of the projection patterns 135a on the surface of array substrate 110 in the frame region 101 is not shown in the cross-sectional view of FIG. 1.

Nevertheless, the Specification will detail, later on, a positional relationship between formation ranges of the alignment film 112 and the alignment film 122, and the formation region of the sealant 133, or a positional relationship between these formation ranges, and the projection patterns 135a and 135b, which is a characteristic configuration of the present invention.

The liquid crystal panel 10 is manufactured by the use of a one-drop-filling (ODF) method in which a plurality of drops of liquid crystals are placed on the surface of one of this pair of the array substrate 110 and the CF substrate 120 and then are sandwiched between both substrates, thereby being sealed and formed within the region surrounded by the sealant 133. The Specification will detail, later on, how to manufacture the liquid crystal panel 10 in the following description about a manufacturing flow (manufacturing method).

Accordingly, the sealant 133 is a pattern having a closed-loop shape; and the liquid crystal panel 10 do not include an inlet that is an opening through which the liquid crystals are injected unlike a liquid crystal panel manufactured by the use of a vacuum injection method. Moreover, the liquid crystal panel 10, as a matter of course, has a structural characteristic in which a sealing material used for sealing the inlet not provided unlike the liquid crystal panel manufactured by the use of such a method. Moreover, the sealant 133 is formed of a photo-curing sealant (photo-curing resin) containing conductive particles.

The transfer electrodes are electrically connected to the common electrode 123 by the conductive particles contained in the sealant 133. The signals received from the terminals 116 are transferred to the common electrode 123. The conductive particles are preferably resilient and deformable in view of stable conduction. An example of the conductive particles is a spherical resin having a gold-plated surface. Besides the aforementioned components, the liquid crystal panel 10 includes a control substrate 137 generating a drive signal, a flexible flat cable (FFC) 138 through which the control substrate 137 is electrically connected to the terminals 116, and other components.

Moreover, on a surface opposite a display surface of the liquid crystal panel 10, a backlight unit (not shown) that is a light source is disposed to face the array substrate 110. Moreover, between the liquid crystal panel 10 and the backlight unit, an optical sheet is disposed that regulates light polarization and light directionality. The liquid crystal panel 10 is contained, along with these components, in a case (not shown) communicating with an outer portion of the CF substrate 120 in the display region 100 that is a display surface. The liquid crystal display according to the first preferred embodiment is configured in the above-mentioned manner.

With reference to FIGS. 3A, 3B, 4A and 4B, the following describes the detailed configuration of the present invention, i.e., for instance, the positional relationship between the formation ranges of the alignment film 112 and the alignment film 122, and the formation region of the sealant 133, the positional relationship between the formation ranges and the projection patterns 135a, the positional relationship between the formation ranges and the projection patterns 135b, or detailed arrangements of the projection patterns 135a and the projection patterns 135b.

Reference is made to the cross-sectional view of the frame region 101 in FIG. 3A. The alignment film 122, which is disposed on the surface of the CF substrate 120, is disposed at least in the display region 100, in which the liquid crystal layer 130 is disposed. That is, the alignment film 122 is disposed in a formation region (CF-substrate alignment film) 122A as illustrated in the drawing. In the frame region 101, the alignment film 122 is provided to overlap part of the inside of the sealant 133, i.e., part of the sealant 133, adjacent to the liquid crystal layer 130.

The projection patterns 135b, which are arranged on the surface of the CF substrate 120, are disposed in an overlap between the formation region 122A of the alignment film 122 and the sealant 133. That is, the projection patterns 135b are disposed in an uneven-surface formation region 135A corresponding to a region in which the projection patterns 135b are arranged, as illustrated in the drawing. In plan view, the projection patterns 135b are circular and are arranged within the uneven-surface formation region 135A, as illustrated in the plan view of FIG. 4A in the frame region 101 adjacent to the CF substrate 120. It is noted that although the drawing illustrates that the projection patterns 135b are arranged in three rows toward an end of the substrate for purposes of illustration, the actual diameter of each projection pattern 135b and the actual size of an interval between the projection patterns 135b are desirably set to be sufficiently smaller than the width of the sealant 133 or the width of the uneven-surface formation region 135A. Accordingly, the projection patterns 135b are required to be arranged within the uneven-surface formation region 135A in equal to or greater than ten rows or in a unit of several tens of rows.

The alignment film 112, which is disposed on the surface of the array substrate 110, is disposed at least in the display region 100, in which the liquid crystal layer 130 is disposed. That is, the alignment film 112 is disposed in a formation region (array-substrate alignment film) 112A (this region is common to the formation region 122A of the alignment film 122 on the CF substrate), as illustrated in the drawing. In the frame region 101, the alignment film 112 overlaps part of the inside of the sealant 133, i.e., part of the sealant 133, adjacent to the liquid crystal layer 130.

The projection patterns 135a, which are arranged on the surface of the array substrate 110, are disposed in an overlap between the formation region 112A of the alignment film 112 and the sealant 133. That is, the projection patterns 135a are disposed in the uneven-surface formation region 135A (this region is common to the uneven-surface formation region where the projection patterns 135b are disposed) corresponding to a region in which the projection patterns 135a are disposed. In plan view, the projection patterns 135a are circular and are arranged within the uneven-surface formation region 135A, as illustrated in the plan view of FIG. 4B in the frame region 101 adjacent to the array substrate 110. It is to be noted that although the drawing illustrates three rows of the projection patterns 135a for purposes of illustration, the projection patterns 135a are actually required to be arranged within the uneven-surface formation region 135A in ten rows or in several tens of rows. In the first preferred embodiment, a planar pattern arrangement of the projection patterns 135a on the array substrate 110 agrees with a planar pattern arrangement of the projection patterns 135b on the CF substrate 120 (i.e., the agreement at a level of a design center value excluding variations in manufacture). The planar pattern arrangements herein each include, for instance, the outer shape of the pattern, and if the pattern is circular, the distance of an interval between the patterns, a planar position of the pattern.

The position of the overlap between the formation region 122A of the alignment film 122 and the sealant 133 or the overlap between the formation region 112A of the alignment film 112 and the sealant 133 is actually more or less shifts within the variations in manufacture. Thus, the even-surface formation region 135A may extend off the outside of the formation region 122A of the alignment film 122 or the formation region 112A of the alignment film 112 (i.e., the uneven-surface formation region 135A may extend to the opposite side of the liquid crystal layer 130) except the outer periphery of the sealant 133. Moreover, the uneven-surface formation region 135A, although being located only within the formation region of the sealant 133 in the drawing, may extend off the inside of an inner end of the sealant 133 (i.e., the uneven-surface formation region 135A may extend to the liquid crystal layer 130).

As mentioned earlier, the alignment film 112 on the array substrate 110 and the alignment film 122 on the CF substrate 120 are each provided to overlap part of the formation region of the sealant 133, the part being adjacent to the liquid crystal layer 130. In addition, each of the projection patterns 135a and the projection patterns 135b is disposed in the overlap between the formation region 112A of the alignment film 112 and the sealant 133, or in the overlap between formation region 122A of the alignment film 122 and the sealant 133. Accordingly, the alignment films 112 and 122 and the projection patterns 135a and 135b are each provided to overlap the part of the formation region of the sealant 133, the part being adjacent to the liquid crystal layer 130. In other words, as obviously seen from FIGS. 3A, 4A, and 4B, the alignment films 112 and 122 and the projection patterns 135a and 135b are not disposed in part of the outside (the opposite side of the liquid crystal layer 130) of the formation region of the sealant 133 (this part is referred to as the outer edge portion of the sealant 133) and in the frame region 101 outside the formation region of the sealant 133.

Accordingly, the sealant 133 is in contact with the surfaces of the array substrate 110 and the CF substrate 120 in the outside of its formation region (its outer edge portion) without the alignment films 112 and 122 interposed therebetween, as illustrated in FIG. 3A. To be more specific, the sealant 133 is in direct contact with a surface of the glass substrate 111 with regard to the array substrate 110, and in direct contact with a surface of the common electrode 123, which is located in the uppermost position among the common electrode 123 and the BM 125 on the surface of the glass substrate 121, with regard to the CF substrate 120. In some embodiments, the frame region 101 does not include the BM 125 or the common electrode 123. In such a case, the sealant 133 may be in direct contact with a surface of the BM 125 on the surface of the CF substrate 120, or in direct contact with the surface of the glass substrate 121. Further, as illustrated in FIG. 2, a region in contact with the surfaces of the array substrate 110 and the CF substrate 120 extends all over the sealant 133 without the alignment films 112 and 122 in the outer edge portion of the sealant 133 interposed therebetween.

The following describes a relationship between each of the projection patterns 135a on the array substrate 110 in the frame region 101 and of the projection patterns 135b on the CF substrate 120 in the frame region 101, and the components disposed in the display region 100, with reference to FIGS. 3A and 3B. The projection patterns 135a, which are arranged on the array substrate 110, and the insulating film 115, which is disposed in the display region 100, are formed at the same time through a step of forming a common organic resin film and a patterning step, the details of which will follow in the description of the manufacturing method. Thus, the projection patterns 135a and the insulating film 115 are made of the same material and have the same thickness (or the surfaces of the projection patterns 135a are flush with the surface of the insulating film 115). The projection patterns 135b, which are arranged on the CF substrate 120, and the sub-spacers 134s, which are arranged in the display region 100, are formed at the same time through a step of forming a common organic resin film and a patterning step. Thus, the projection patterns 135b and the sub-spacers 134s are made of the same material and have the same thickness (or the surfaces of the projection patterns 135b are flush with the surfaces of the sub-spacers 134s).

As mentioned earlier, the formation region 112A and the formation region 122A, both of which are the respective formation regions of the alignment films 112 and 122, partly overlap the uneven-surface formation region 135A, in which the projection patterns 135a and the projection patterns 135b are disposed. In this overlap region, the alignment film 112 and the alignment film 122 are formed after the projection patterns 135a and the projection patterns 135b are formed. Moreover, in the display region 100, the alignment film 112 and the alignment film 122 are formed after the insulating film 115, the main spacers 134m, and the sub-spacers 134s are formed. Accordingly, with respect to relatively protruding portions (protrusions) of the individual substrates, on which the insulating film 115, the main spacers 134m, the sub-spacers 134s, the projection patterns 135a, and the projection patterns 135b are disposed, the alignment film 112 and the alignment film 122 are disposed on the surfaces (upper surfaces: tops) of the components in the protrusions. Meanwhile, with respect to gaps of the individual substrates without these components (i.e., cavities of the substrates), the alignment film 112 and the alignment film 122 are disposed at the bottoms of the cavities.

Reference is made to the alignment film 112 and the alignment film 122, which are disposed on the surfaces (upper surfaces: tops) of the components in the protrusions, in the sub-spacers 134s, the projection patterns 135a, and the projection patterns 135b, each of which locally forms the protrusion. In these locations, the alignment film 112 and the alignment film 122 are more or less reduced to be thin through manufacturing processes. Accordingly, as illustrated in FIGS. 3A and 3B, the alignment films 112a and alignment films 122a are disposed in these locations. Further, alignment films on the main spacers 134m, and alignment films on the sub-spacers 134s and the projection patterns 135a and 135b and in a side surface of the insulating film 115 have a large degree of such a reduction of their thicknesses, and thus are possibly not provided. Accordingly, the drawing does not illustrate such alignment films.

The following describes functions of the liquid crystal display according to the first preferred embodiment. The liquid crystal display according to the first preferred embodiment is configured such that the alignment film 112 and the alignment film 122 overlap part of the formation region of the sealant 133. Meanwhile, the alignment film 112 and the alignment film 122 need to be formed to cover the display region 100 without fail in order to prevent poor display. Accordingly, the alignment film 112 and the alignment film 122 need to be designed in such a manner that the positions of ends (design center values) of the alignment films 112 and 122 are spaced away from the outer periphery of the display region 100 by a predetermined distance, by reflecting positional shifts of the ends of the alignment films 112 and 122 caused by variations in manufacture. Since the liquid crystal display is configured such that the alignment film 112 and the alignment film 122 overlap part of the formation region of the sealant 133 in the first preferred embodiment, however, the positions of the ends (design center values) of the alignment films 112 and 122 are set to overlap the inside of the formation region of the sealant 133. In other words, a formation position of the sealant 133 is provided close to the display region 100.

To be more specific, with respect to the distance between the formation position of the sealant 133 and the display region 100, such a configuration eliminates the need to provide a margin for preventing the sealant 133 from overlapping the ends of alignment films 112 and 122. This enables the formation position of the sealant 133 including the variations in manufacture to be close to a position of the margin that is provided for preventing the position of the end of the sealant 133 from overlapping the display region 100. Nevertheless, the liquid crystal display according to the first preferred embodiment is configured such that the alignment film 112 and the alignment film 122 do not extend outside the formation region of the sealant 133. Accordingly, the formation position of the sealant 133 is required to be provided close to the display region 100 to a degree to which an interval between the ends of the alignment films 112 and 122, and the outer end of the sealant 133 is at least not zero, the ends of the alignment films 112 and 122 being located furthest within the variations in manufacture is at least not zero, the outer end of the sealant 133 being the closest to the display region 100 within the variations in manufacture.

In either way, the liquid crystal display according to the first preferred embodiment enables design in which the distance between the formation position of the sealant 133 and the display region 100 is greatly reduced. Such design enables a narrowed-down frame at a relatively high level. The following describes, for instance, influences and functions on reliability due to the configuration in which the sealant 133 partly overlaps the alignment film 112 and the alignment film 122.

In the liquid crystal display according to the first preferred embodiment, the overlapping region between the sealant 133 and each of the alignment films 112 and 122 is provided. This commonly can cause a reduction in adhesion of the sealant 133 if the sealant 133 is in contact with the surfaces of the substrates with the alignment films 112 and 122 interposed therebetween. The liquid crystal display according to the first preferred embodiment is, however, configured such that the projection patterns 135a and the projection patterns 135b are disposed in the vicinity of the inside of the sealant 133, the inside being the overlap region between the sealant 133 and each of the alignment films 112 and 122. Accordingly, an uneven surface is formed on the surface of the array substrate 110 or the CF substrate 120. The uneven surface on the surface of each substrate increases an area in which the sealant 133 is in contact with the array substrate 110 or the CF substrate 120, thereby improving the adhesion of the sealant 133. Further, although the alignment film material, which forms the alignment film 112 and the alignment film 122, is applied and formed onto the uneven surface, which is formed by the projection patterns 135a or the projection patterns 135b, the alignment films are reduced to be thin or scarcely formed on the upper surfaces and side surfaces of the protrusions. This prevents the reduction in adhesion caused by the sealant 133 in contact with the surfaces of the substrates with the alignment films 112 and 122 interposed therebetween.

As described above, the liquid crystal display according to the first preferred embodiment, although including the overlapping region between the sealant 133 and each of the alignment films 112 and 122, is configured such that the uneven surfaces are formed thanks to the projection patterns 135a and 135b disposed on the surfaces of the array substrate 110 and the CF substrate 120. Such a configuration prevents the reduction in adhesion of the sealant 133 in the overlapping region between the sealant 133 and each of the alignment films 112 and 122. Further, the liquid crystal display is configured such that the outer periphery of the sealant 133 has some location in which the sealant 133 is joined to the surface of the array substrate 110 or the CF substrate 120 without the alignment film 112 or the alignment film 122 interposed therebetween. This location, adhesion is obtained that is equal to that in a typical liquid crystal display. Consequently, the sealant 133, as a whole, contributes to achieving a necessary adhesion.

Still further, the liquid crystal display is configured such that the location in which the sealant 133 is joined to the surface of the array substrate 110 or the CF substrate 120 all over the outer periphery (outer edge portion) of the sealant 133, particularly, all over the sealant 133 without the alignment film 112 or the alignment film 122 interposed therebetween, such that neither the projection patterns 135a nor the projection patterns 135b is disposed in this location, and such that the sealant 133 is joined to the surface of the array substrate 110 or the CF substrate 120 without the projection patterns 135a or the projection patterns 135b interposed therebetween. Such a configuration enables a sufficient resistant to moisture.

Reference is made to a specific function. The alignment film material (e.g., a polyimide film), which forms the alignment films 112 and 122, and the material (the photosensitive acrylic film that is the same material as those of the insulating film 115 and the sub-spacers 134s) forming the projection patterns 135a and 135b have a higher hygroscopic property and a higher moisture transparency than the sealant 133. Hence, if any of the projection patterns 135a, the projection patterns 135b, the alignment film 112, and the alignment film 122 is disposed between the sealant 133 and either substrate, in particular, if any of them is disposed between the sealant 133 and either substrate across the sealant 133 in a direction of the width of the sealant 133, moisture penetrates the inside surrounded by the sealant 133 from the outside of the liquid crystal panel 10 through these members (the inner sides of these members); that is, the moisture penetrates the inner side of the liquid crystal layer 130. This greatly reduces the reliability. In contrast to this, the liquid crystal display according to the first preferred embodiment is configured such that the location in which the sealant 133 is in contact with the surfaces of the substrates between the sealant 133 and the substrates at least in the outer periphery (the outer edge portion) of the sealant 133, particularly, all over the sealant 133 without the aforementioned materials having a higher hygroscopic property and a higher moisture transparency interposed therebetween. Such a configuration prevents external moisture from penetration in this location. Consequently, the sufficient resistance to moisture is achieved.

The following summarizes the effects achieved in the first preferred embodiment on the basis of the aforementioned several functions. The liquid crystal display according to the first preferred embodiment is provided with the overlap region between the sealant 133 and each of the alignment films 112 and 122. In this overlap region, each of the projection patterns 135a and the projection patterns 135b is disposed on the surface of the array substrate 110 or the CF substrate 120, thereby forming the uneven surface. Moreover, the liquid crystal display has a portion in which the sealant 133 is joined to the surface of the array substrate 110 or the CF substrate 120 in the outer periphery (the outer edge portion) of the sealant 133, particularly, all over the sealant 133 without the alignment film 112 or the alignment film 122 interposed therebetween. Such a configuration enables design in which the distance between the formation position of the sealant 133 and the display region 100 is greatly reduced. This achieves the following effects: a narrowed-down frame at a relatively high level; minimization of a reduction in adhesion caused by the overlap between the alignment film 112 and the alignment film 122 in the part of the formation region of the sealant 133; and a sufficient resistance to moisture. In short, both the reliability and the narrowed-down frame are achieved at a relatively high level.

Further, the liquid crystal display is configured such that the projection patterns 135a on the surface of the array substrate 110 or the projection patterns 135b on the surface of the CF substrate 120 are made of the same material and have the same thickness as the insulating film 115, which functions as a flattening film flattening the surfaces of the substrates on the columnar spacers (to be specific, the sub-spacers 134s) and the TFTs 114, both of which are disposed in the display region 100 in a typical liquid crystal display. Consequently, the projection patterns 135a and the projection patterns 135b are formed by the use of materials that are contained in the typical liquid crystal display. Moreover, the projection patterns 135a and the projection patterns 135b are formed at the same time as already-existing components included in the display region 100 through steps of forming films that form these components acid patterning steps. This eliminates the need for preparing a particular material and eliminates an increase in manufacturing cost due to an increase in process step. Moreover, the manufacture involves no processes that cannot be practically employed.

Still further, the liquid crystal display is configured such that the columnar spacers and the insulating film 115, which functions as a flattening film, each have a relatively large thickness of the order of 1 to 3 μm within which the spacers and the films are easily formed by applying the organic resin (i.e., the spacers and the film are easy to have a larger thickness than an inorganic film disposed on the array substrate 110 and the CF substrate 120). Such a configuration enables the formation of steps of the uneven surfaces that are effective to an increase in adhesion on the order of 1 to 3 μm, the uneven surface being formed by the projection patterns 135a or the projection patterns 135b having the same thickness as the columnar spacers and the insulating film 115. It is to be noted that a detailed method for manufacturing the liquid crystal display according to the first preferred embodiment will follow later on.

<Flow of Manufacturing Liquid Crystal Display>

With reference to a flowchart of FIG. 5, the following describes a flow of manufacturing the liquid crystal display according to the first preferred embodiment of the present invention, the liquid crystal display including the liquid crystal panel having the aforementioned configuration. The liquid crystal panel is commonly manufactured by cutting out one liquid crystal panel or multiple liquid crystal panels from a larger motherboard than a final shape of the liquid crystal panel. It is noted that this cutting out is also referred to as multiple-piece cutting out. The motherboard does not undergo the cutting out in steps S1 to S8 (to some point of a step S9) in FIG.

First of all, a substrate preparing step includes forming wires on a mother array substrate and a mother CF substrate. That is, the mother array substrate undergoes the formation of the components illustrated in FIGS. 1, 2, 3A, and 3B, such as the gate wires 117, the source wires 118, the TFTs 114, the insulating film 115, the pixel electrodes 113, and the projection patterns 135a. This formation is performed in a manner similar to a method for manufacturing an array substrate of a typical liquid crystal panel. Thus, detailed description of the formation will not be elaborated here.

It is to be noted that the projection patterns 135a is required to undergo patterning in the frame region 101 so as to be positioned, to have a pattern shape, and to be arranged as illustrated in the plan view of FIG. 4B. In other words, a mask pattern in the patterning is required to be designed in conformance with the pattern shape of the projection patterns 135a. This patterning is performed at the same time as the patterning of the insulating film 115, which functions as the flattening film, by the use of the photosensitive acrylic resin (having a thickness of the order of 1 to 3 μm).

Meanwhile, the mother CF substrate undergoes the formation of the components illustrated in FIGS. 1, 2, 3A, 3B, 4A, and 4B, such as the BM 125, the color filters 124, the dual-spacer structure including the main spacers 134m and sub-spacers 134s, and the projection patterns 135b. This formation is performed in a manner similar to a method for manufacturing a CF substrate of a typical liquid crystal panel. Thus, detailed description of the formation will not be elaborated here.

It is to be noted that the projection patterns 135b are required to undergo patterning in the frame region 101 so as to have the same height (e.g., the order of 2 μm) as the sub-spacers 134s, to be positioned, to have a pattern shape, and to be arranged as illustrated in the plan view of FIG. 4A, in a manner similar to the formation of the sub-spacers 134s. In other words, a mask pattern in the patterning is required to be designed in conformance with the pattern shape of the projection patterns 135b. This patterning is performed at the same time as the patterning of the dual-spacer structure including the main spacers 134m and the sub-spacers 134s by the use of a halftone-mask (alternatively, referred to as a gray-tone mask or a halftone-exposure mask) technique that is a publicly known method for forming a dual-spacer structure.

To be more specific, a photosensitive resin film is applied and formed in order to form the main spacers 134m, the sub-spacers 134s, and the projection patterns 135b. Then, a halftone mask is used to perform the following exposure processing: a region excluding where the main spacers 134, the sub-spacers 134s, and the projection patterns 135b are formed undergoes exposure under a first exposure condition so as to remove the entire photosensitive resin film; the formation region of the main spacers 134m undergoes exposure under a second exposure condition so as to leave the entire photosensitive resin film; and the formation regions of the sub-spacers 134s and the projection patterns 135b undergo halftone-exposure that is a third exposure condition between the aforementioned two exposure conductions so that the photosensitive resin film in a direction of its width partly remains.

It is noted that the exposure processing per se is single-time exposure processing in which the halftone mask is designed to have different kinds of optical transparency that constitute the three kinds of exposure conditions in conformance with the aforementioned regions. As described above, the main spacers 134m, the sub-spacers 134s, and the projection patterns 135b in the first preferred embodiment of the present invention are relatively easy to be formed at as low cost as the formation of conventional columnar spacers having a dual-spacer structure.

After the preparation of the mother array substrate and the mother CF substrate as described above, the following process steps are performed. Step S1 is substrate cleaning. This step is cleaning the prepared mother array substrate and the prepared mother CF substrate. Step S2 is application of the alignment film material. This step is applying and forming the alignment film material onto one of the surfaces of each of the mother array substrate and the mother CF substrate. In this step, for instance, the alignment film material is made of an organic material such as polyimide is transferred and applied, by the use of a flexography method, to main surfaces of the mother array substrate and the mother CF substrate, the main surfaces facing each other. To be more specific, this transfer processing includes moving, in a predetermined direction of transfer, a transfer roller with the alignment film material applied to a surface of the transfer roller. It is noted that a specific direction of transfer will be described in the individual preferred embodiments. In this way, the alignment film material is transferred and applied to a predetermined application region on the surface of the mother CF substrate. It is to be noted that the application region of the alignment film material is, likewise a conventional application region, designed to have a print region that is a minimum region enough to cover at least the display region 100 by reflecting variations in manufacture. The steps S2 also includes a sintering process with a hot plate and a drying process.

Step S3 is alignment. This step is aligning a surface of the alignment film material by, for instance, rubbing the alignment film material to form the alignment film 112 and the alignment film 122. As mentioned earlier with reference to FIGS. 3A and 3B, the alignment film 122 or the alignment film 112 covers the surfaces of the main spacers 134m, the sub-spacers 134s, and the projection patterns 135b that are disposed on the mother CF substrate, or the surfaces of the projection patterns 135a that are disposed on a mother TFT substrate. Nevertheless, the alignment film material is scarcely applied particularly to the surfaces (the side surfaces) of the main spacers 134m, the sub-spacers 134s, and the projection patterns 135b. Thus, the alignment film 112 and the alignment film 122 are not formed on these surfaces in the application of the alignment film material. Meanwhile, the surface (upper surface: top) of each protrusion is reduced to be thin through the rubbing processing. How much the surface is reduced depends on a condition of the rubbing processing (a rubbing strength: a pressing force of a rubbing roller).

When a normal rubbing strength is employed, the alignment film 112 and the alignment film 122 (on the upper surfaces of the components in the protrusions, the alignment films 112a and the alignment films 122a) each have the thickness illustrated in FIGS. 3A and 3B. A condition of a greater rubbing strength can further reduce the thickness of the alignment film material applied at the tops of the components in the protrusions. In this case, a configuration can be achieved that includes no alignment films 112a and 122a, which are formed on the surfaces (upper surfaces: tops) of the projection patterns 135a and the projection patterns 135b, which constitute the protrusions, or formed on the surfaces (upper surfaces: tops) of the sub-spacers 134s. It is to be noted that FIGS. 6A and 6B respectively illustrate a cross-sectional view of the frame region 101 of the liquid crystal display and a cross sectional view of the display region 100 of the liquid crystal display, where the liquid crystal display is manufactured under a condition of a greater rubbing strength, and that FIGS. 6A and 6B correspond to FIGS. 3A and 3B in the first preferred embodiment.

Figure 6A:
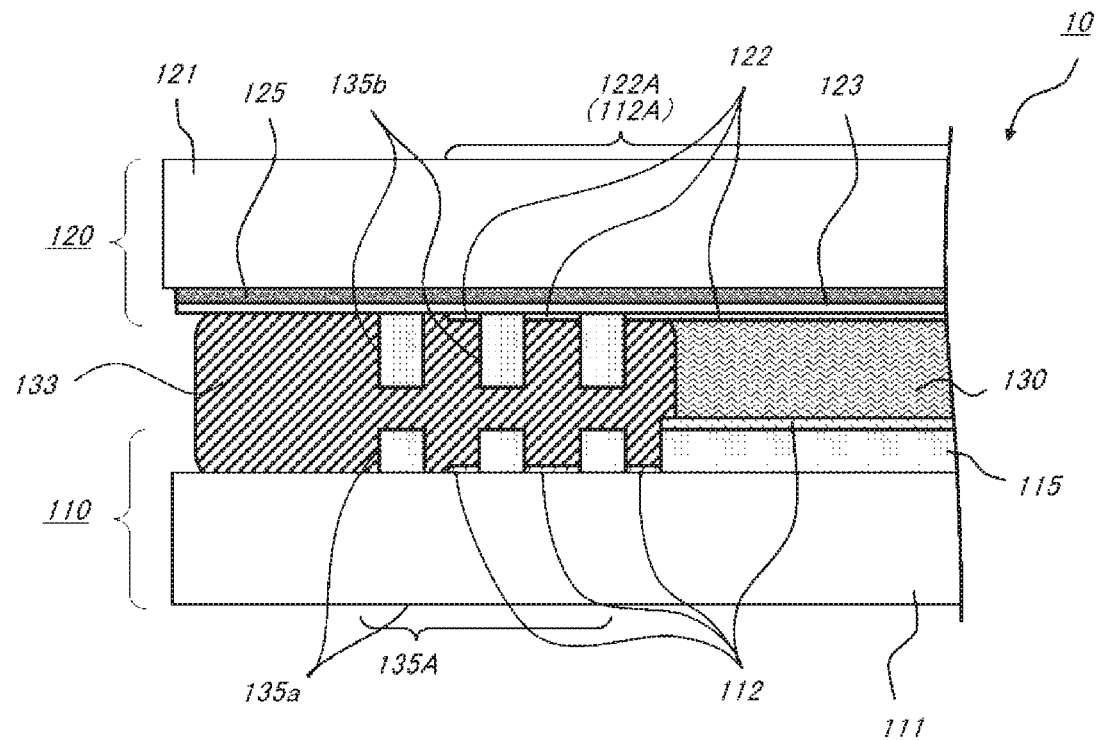
FIGS. 6A and 6B are cross-sectional views of main parts of a liquid crystal panel of a liquid crystal display according to a modification of the first preferred embodiment of the present invention.
Figure 6B:
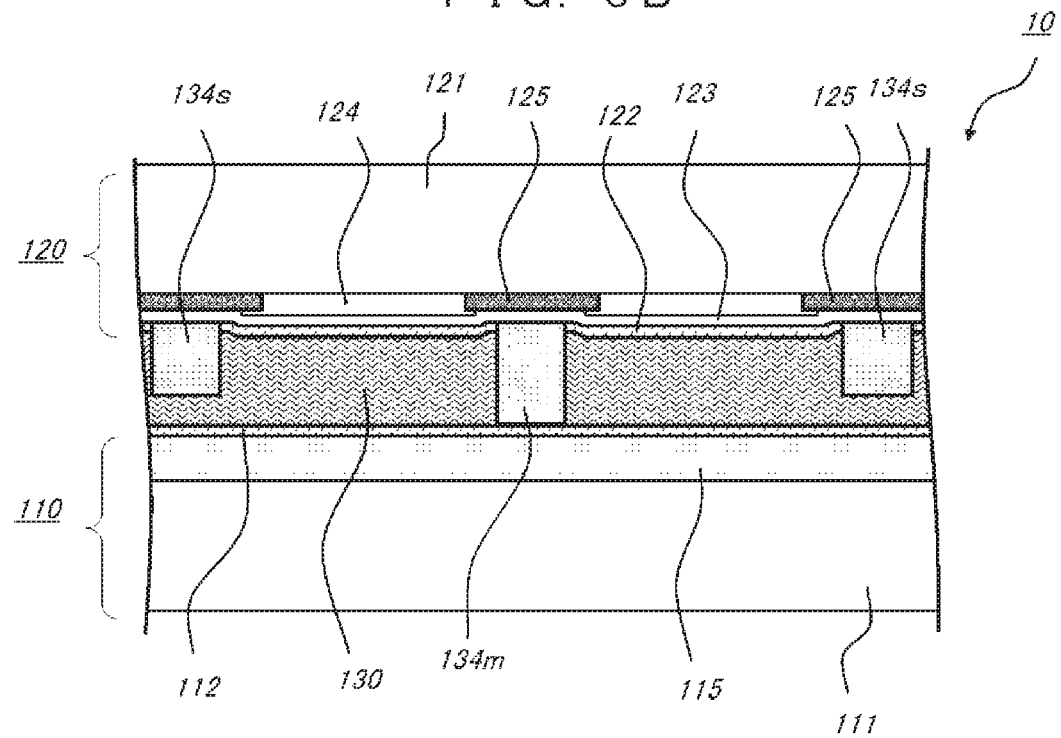

In particular, the aforementioned condition of a greater rubbing strength results in, as illustrated in FIGS. 6A and 6B, non-formation of the alignment films 112a and 122a on the surfaces (upper surfaces: tops) of the projection patterns 135a and the projection patterns 135b, which constitute the protrusions, or on the surfaces (upper surfaces: tops) of the sub-spacers 134s. Consequently, the surfaces (upper surfaces: tops) of the projection patterns 135a and the projection patterns 135b are in direct contact with the sealant 133 in the overlap between the sealant 133 and each of the formation region 112A of the alignment film 112 and the formation region 122A of the alignment film 122. Alternatively, the alignment films 112a and the alignment films 122a can slightly remain. This enables the projection patterns 135a and the projection patterns 135b to be in contact with the sealant 133 with super-thin alignment films 112a and super-thin alignment films 122a interposed therebetween. In either way, the condition of a greater rubbing strength achieves the aforementioned configuration. This further improves the adhesion between the surfaces of the array substrate 110 and the CF substrate 120 (to be specific, the uneven surfaces on the surfaces of the substrates, which are formed of the projection patterns 135a and the projection patterns 135b), and the sealant 133.

It is to be noted that in some embodiments, contrary to a typical mask rubbing method, only the surfaces of the projection patterns 135a and 135b in the frame region 101 undergo rubbing with a greater rubbing strength under the condition of a greater rubbing strength. In other words, the display region 100 and the frame region 101 may separately undergo rubbing processing under the following rubbing conditions different from each other: for the display region 100, rubbing processing under a condition of a normal rubbing strength; and for the frame region 101, rubbing processing under a different condition of a greater rubbing strength.

In such a case, since the display region 100 undergoes rubbing processing with a normal rubbing strength, the alignment films 122a on the surfaces (upper surfaces: tops) of the sub-spacers 134s remain in the display region 100, as illustrated in FIG. 3B. Meanwhile, in the frame region 101, the alignment film material applied and formed at the tops of the protrusions is reduced to be further thin. This achieves a configuration in which the alignment films 112a and the alignment films 122a on the surfaces (upper surfaces: tops) of the projection patterns 135s and the projection patterns 135b are not formed, or a configuration in which alignment films thinner than the alignment films 122a on the surfaces (the upper surface: the tops) of the sub-spacers 134s, i.e., super-thin alignment films 112a and super-thin alignment films 122a are formed on the surfaces (upper surfaces: tops) of the projection patterns 135a and the projection patterns 135b.

In the aforementioned method, the use of the mask enables any two conditions of rubbing strengths different from each other between the display region 100 and the frame region 101 to be selected. Consequently, a configuration is achieved in which the alignment film 112 in the pixel electrodes 113 in the display region 100 and the alignment film 122 in the display region 100 undergo rubbing for display under an optimal condition of a normal rubbing strength, and then the alignment films 112a and 122a on the surfaces of the projection patterns 135a and 135b in the frame region 101 are removed.

FIGS. 6A and 6B provides a different method for achieving the configuration, in which the alignment films 112a and 122a are not formed on the surfaces (upper surfaces: tops) of the projection patterns 135a and 135b or on the surfaces (upper surfaces: tops) of the sub-spacers 134s. The projection patterns 135a and the projection patterns 135b may contain a porous material (e.g., metal, ceramic, or glass) instead, of the aforementioned material to achieve the configuration illustrated in FIGS. 6A and 6B.

The projection patterns 135a and the projection patterns 135b may contain the porous material. Accordingly, once the alignment film material, which forms the alignment films 112 and the alignment film 122, is applied to the surfaces of the projection patterns 135a and the projection patterns 135b, the applied alignment film material is absorbed within the voids of the porous material contained in the projection patterns 135a and the projection patterns 135b. As a result, the alignment film 112 and the alignment film 122 are removed from the surfaces of the projection patterns 135a and the projection patterns 135b, thereby achieving the configuration in FIGS. 6A and 6B.

The change of the material contained in the projection patterns 135a and the projection patterns 135b to the porous material (e.g., metal, ceramic, or glass) further improves the adhesion between the surfaces of the array substrate 110 and the CF substrate 120 (to be specific, the uneven surfaces on the surfaces of the substrates, formed by the projection patterns 135a and the projection patterns 135b), and the sealant 133.

Step S4 is seal-paste application. This step is ejecting for application, using a seal dispenser, an adhesive paste that forms the sealant 133 onto the main surface of the mother array substrate or the mother CF substrate. The paste is applied in pattern form so as to surround the display region of the liquid crystal panel, thereby forming the sealant 133.

Here, the adhesive paste is required to be applied in such a manner that, as mentioned earlier, the formation region of the sealant 133 is close to the position of the margin provided for preventing the position of the end of the sealant 133, including the variations in manufacture from overlapping the display region 100, and is close to the display region 100 to a degree to which the interval between the ends of the align films 112 and 122, which have already formed on the mother array substrate and the mother CF substrate, and the outer end of the sealant 133 is at least not zero if the outer end of the sealant 133 is the closest to the display region 100 within the variations in manufacture. However, an actual application location of the sealant 133 needs to be designed in advance in such a manner that a predetermined distance is specified as the center of the application location, the predetermined distance having a proper margin reflecting both a range of the variations in manufacture concerning the positions of the ends of the alignment films 112 and 122, and a range of positional variations concerning, for instance, the application location of the sealant 133 or the position of the end of the sealant 133.

Step S5 is liquid crystal dropping. This step is dropping a liquid crystal material into a region surrounded by the sealant 133, on the substrate on which the sealant 133 is formed. Step S6 is vacuum joining. This step is joining the mother array substrate and the mother CF substrate together under vacuum to form a mother cell substrate. Step S7 is ultraviolet (UV) irradiation. This step is irradiating the mother cell substrate with ultraviolet rays to temporally cure the sealant. Then, in step S8, the sealant undergoes after-curing by heating to be completely cured. This obtains the cured sealant 133.

Step S9 is cell cut. This step is cutting the mother cell substrate, along scribe lines, into individual liquid crystal. These individual liquid crystal cells undergo polarizer joining in step S10 and mounting of control substrates in step S11. A series of the process steps completes the liquid crystal panel 10 as illustrated in FIGS. 1 and 2.

Furthermore, the liquid crystal display according to the first embodiment of the present invention is finally completed through the following processes: placing, through an optical film such as an optical retardation plate, the backlight unit onto the hack surface of the array substrate 110 of the liquid crystal panel 10, the back surface being invisible; and accommodating, as appropriate, the liquid crystal panel 10 and these peripheral members in a frame (case) made of a material, such as resin and metal.

The liquid crystal display manufactured through these process steps operates in the following manner. For instance, when an electric signal including an image signal and a control signal is received from the control substrate 137 that is an external circuit, a driving voltage is applied across the pixel electrodes 113 and the common electrodes 123; then the direction of the molecules of the liquid crystals changes in accordance with the driving voltage. As a result, a light transmittance of each pixel is regulated. Moreover, light emitted from the backlight unit transmits to the outside or is blocked through the array substrate 110, the liquid crystal layer 130, and the CF substrate 120 in accordance with the light transmittance of each pixel. Accordingly, color images, for instance, are displayed in the display region 100 of the liquid crystal panel 10.

The following provides a supplemental description of the specific method of designing the application location of the sealant 133 in accordance with formation positions of the alignment film 112 and the alignment film 122. Different processes through which the alignment film 112 and the alignment film 122 are formed can produce different positions of the ends of the alignment film 112 and the alignment film 122. Outermost positions, within such variations, of the ends of the alignment films 112 and 122 (e.g., for a distance of 3 σ, the positions are away from a design center position of the ends of the alignment films 112 and 122 by 3 σ) are required to be designed to be inside an innermost position of the outer end of the sealant 133 within variations in position of the outer end of the sealant 133 (in this design, a further margin may be provided as necessary). Such design achieves a configuration in which the outer periphery of the sealant 133 certainly has a portion in contact with the surfaces of the individual substrates without the alignment film 112 and the alignment film 122 interposed therebetween. This configuration is desirable in the first preferred embodiment.

The sealant 133 basically overlaps the alignment film 112 and the alignment film 122. In some embodiments, the sealant 133 is designed so as not to overlap the alignment film 112 and the alignment film 122 within the individual variations. Such design achieves a less narrowed-down frame than the desirable design of the application location of the sealant 133, which is mentioned earlier in the first preferred embodiment. To be specific, innermost positions, within the variations, of the ends of the alignment film 112 and the alignment film 122 (for a distance of 3σ, the positions are inside from the design center positions of the ends of the alignment films 112 and 122 by 3σ) may be set so that the alignment film 112 and the alignment film 122 do not overlap the formation region of the sealant 133 (for instance, so that the alignment film 112 and the alignment film 122 do not overlap the formation region of the sealant 133 if the formation region of the sealant 133 is shifted outside within the variations in manufacture).

Such design still allows the formation region of the sealant 133 to basically overlap part of the alignment film 112 and the alignment film 122. Although more or less achieving a less narrowed-down frame, this design achieves a relatively high level of reliability, and achieves a fundamental effect of the first preferred embodiment of the present invention, i.e., a certain degree of narrowed-down frame.

In the first preferred embodiment, the projection patterns 135a are made of the same material and have the same thickness as the insulating film 115; and the projection patterns 135b, as the sub-spacers 134s. In addition, the projection patterns 135a are formed at the same time as the insulating film 115; and the projection patterns 135b, as the sub-spacers 134s. In some embodiments, the projection patterns 135b are formed at the same time as the main spacers 134m, in this case, the projection patterns 135b may be made of the same material and have the same thickness as the main spacers 134m. Alternatively, the projection patterns 135b may be made of the same material and have the same thickness as the other components on the surface of the CF substrate 120, such as the BM 125 and the color filters 124. Moreover, although not described in the first preferred embodiment, an overcoat layer that flattens the surface of the CF substrate 120 may be provided. In this case, the projection patterns 135b may be made of the same material and have the same thickness as the overcoat layer.

The aforementioned modifications similarly enables the projection patterns 135b to be disposed on the CF substrate 120 while eliminating the need for preparing the particular material obtained in the first preferred embodiment and eliminating an increase in manufacturing cost due to the increase in process step.

In some embodiments, the projection patterns 135a are made of the same material and have the same thickness as the components on the array substrate 110 except the insulating film 115. Alternatively, the projection patterns 135a may be made of the same material as the insulating film 115 and have a thickness different from a thickness of the insulating film 115. For instance, in a manner similar to placing the dual-spacer structure on the CF substrate 120, the organic photosensitive resin film, which forms the insulating film 115, may undergo exposure with a halftone mask and then patterning, thereby forming the projection patterns 135a having a thickness different from a thickness of the insulating film 115. Still alternatively, a method of forming the projection patterns 135a or the projection patterns 135b alone may be chosen if the increase in manufacturing cost is permissible.

Nevertheless, reference is made to the projection patterns 135a and the projection patterns 135b in the first preferred embodiment. For a combination in which the projection patterns 135a are made of the same material as the insulating film 115, and in which the projection patterns 135b are made of the same material as the sub-spacers 134s, and further, for a combination in which a planar arrangement of the projection patterns 135a on the array substrate 110 coincides with a planar arrangement of the projection patterns 135b on the CF substrate 120, as obviously seen from the cross-sectional view of FIG. 1 or FIG. 3A, a configuration is relatively easily obtained in which a gap is produced between each projection pattern 135a on the array substrate 110 and each projection pattern 135b on the CF substrate 120, and in which the sealant 133 is disposed in each gap. Herein, examples of each planar arrangement include an outer size, a diameter (if the patterns are circular), a distance of an arrangement interval, and a planar position.

This configuration is obtained thanks to that fact that the sub-spacers 134s and the insulating film 115, which are respectively flush with the projection patterns 135b and the projection patterns 135a, do not abut each other and are distant away from each other, as obviously seen from the cross-sectional view of FIG. 3B. Here, in FIG. 3B, the sub-spacers 134s faces the insulating film 115 with the liquid crystal layer 130 interposed therebetween.

This achieved configuration, in which the gap is produced between each projection pattern 135a and each projection pattern 135b and in which the sealant 133 is disposed in each gap, is preferable in that the sealant 133 exerts its joining strength on the joining between the projection patterns 135a and the projection patterns 135b as a matter of course, thereby improving a joining strength between the array substrate 110 and the CF substrate 120. Meanwhile, as mentioned earlier, the aforementioned combination in the first preferred embodiment, in which the projection patterns 135a and the projection patterns 135b are respectively made of the same materials and have the same thicknesses as the insulating film 115 and the sub-spacers 134s, is optimal in that such a desirable configuration is easily achieved.

Second Preferred Embodiment

The following describes a liquid crystal display according to a second preferred embodiment that is generally configured in the same manner as the liquid crystal display according to the first preferred embodiment with the following exception: a change is made to a configuration of individual patterns that are provided for forming uneven surfaces on the array substrate 110 and the CF substrate 120, in an overlap between the sealant 133 and the formation region 112A of the alignment film 112 or the formation region 122A of the alignment film 122 in the frame region 101. The following mainly describes this change.

Figure 8A:
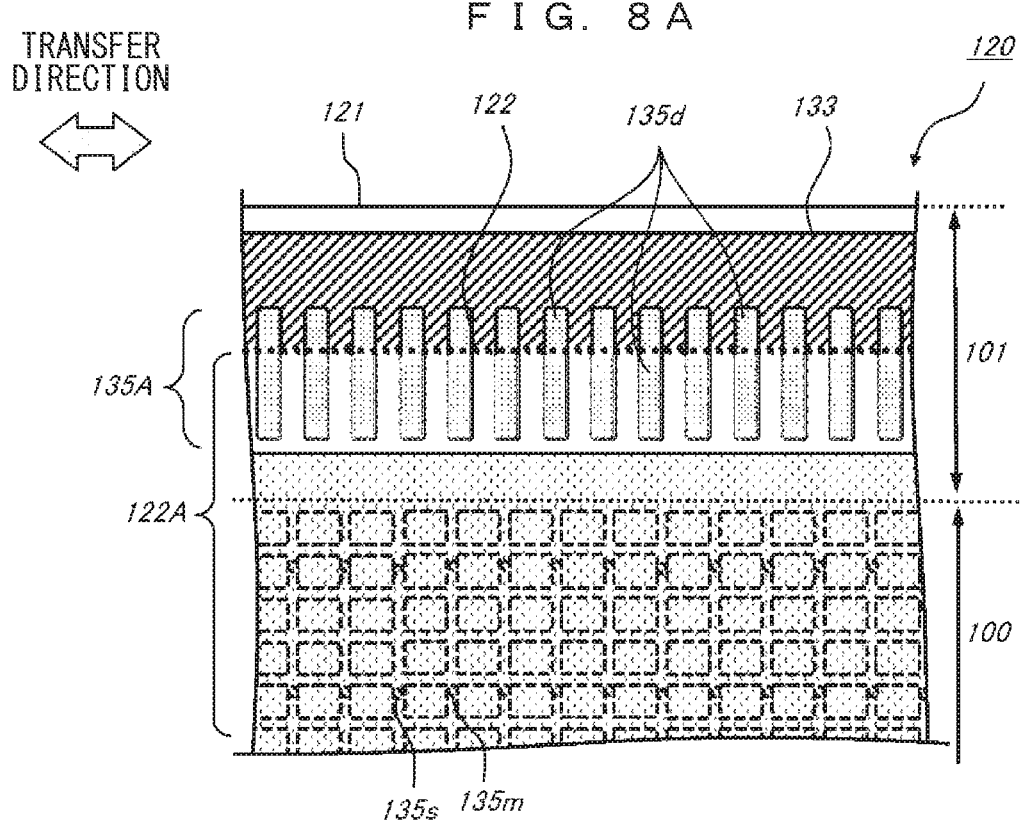
FIGS. 8A and 8B are plan views of main parts of a color filter substrate and an array substrate of a liquid crystal display according to a first preferred embodiment of the present invention.
Figure 8B:
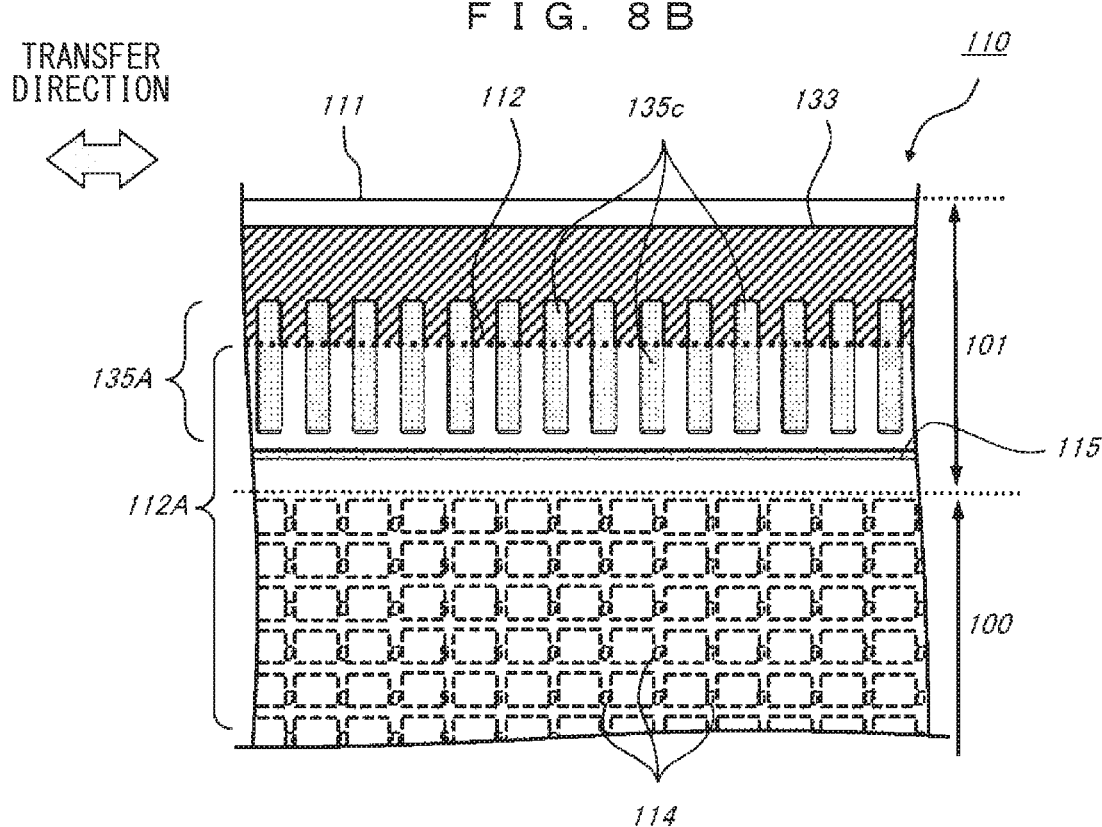

With reference to FIGS. 7A, 7B, 8A, and 8B, described is a configuration of projection patterns 135c and a configuration of projection patterns 135d, both patterns being provided tar forming the uneven surfaces on the array substrate 110 and the CF substrate 120. These configurations are characteristic configurations of the liquid crystal display according to the second preferred embodiment. Here. FIGS. 7A, 7B, 8A, and 8B are detailed plan views of main parts of the liquid crystal display according to the second embodiment. In particular. FIGS. 7A and 7B correspond to FIGS. 4A and 4B in the first preferred embodiment. In addition. FIGS. 8A and 8B are detailed plan views of the main parts with a 90° turn from the main parts illustrated in FIGS. 7A and 7B. That is. FIGS. 8A and 8B are detailed plan views of the main parts in a position in which the sealant 133 extends in a direction with a 90° turn from a direction illustrated in FIGS. 7A and 7B. It is to be noted that FIG. 7A and FIG. 8A are each a plan view of the CF substrate 120. FIG. 7B and FIG. 8B are each a plan view of the array substrate 110.

Arrows in the drawings each denote a transfer direction in applying and forming the alignment film material, which forms the alignment film 112 or the alignment film 122 (to be specific, a direction in which a transfer roller moves in flexography in which the alignment film material is transferred and applied). In FIGS. 7A and 7B, the transfer direction is set to be perpendicular to a direction in which the sealant 133 extends. Since FIGS. 8A and 8B illustrate the main parts with a 90° turn from the main parts illustrated in FIGS. 7A and 7B, the transfer direction in FIGS. 8A and 8B is turned from the transfer direction in FIGS. 7A and 7B by 90°. Thus, in FIGS. 8A and 8B, the transfer direction is set to be parallel with the direction in which the sealant 133 extends. It is to be noted that although the transfer direction is reverse in the vicinity of the sealant 133 with a 180° turn from the individual positions of the sealant 133 in FIGS. 7A, 7B, 8A, and 8B, each component is required to be provided in a manner similar to FIGS. 7 and 8 except the transfer direction. Accordingly. FIGS. 7A, 7B, 8A, and 8B each illustrate an orientation direction denoted by a bidirectional arrow so that the orientation direction also includes the reverse direction.

The liquid crystal display according to the second embodiment is configured such that the projection patterns 135c are arranged on the surface of the array substrate 110, and the projection patterns 135*d* are arranged on the surface of the CF substrate 120, in the overlap between the sealant 133 and the formation region 112A of the alignment film 112 or the formation region 122A of the alignment film 122 in the frame region 101 so that the uneven surfaces are formed on the surfaces of the array substrate 110 and the CF substrate 120. As illustrated in FIGS. 7A, 7B, 8A, and 8B, each of the projection patterns 135*c* and the projection patterns 135*d* is formed of a rectangular pattern and a plurality of projection patterns 135*c* and a plurality of projection patterns 135*d* are arranged.

The direction in which sealant 133 extends and the direction in which each rectangular pattern extends in FIGS. 8A and 8B are turned from the corresponding directions in FIGS. 7A and 7B by 90°, in the individual sides of the projection patterns 135*c* and the projection patterns 135*d*, in which the direction where sealant 133 extends in FIGS. 8A and 8B is turned from the corresponding direction in FIGS. 7A and 7B by 90°. Meanwhile, the relationship between the projection patterns 135*c* of the alignment film 112 and the transfer direction in FIGS. 7A and 7B agrees with the relationship between the projection patterns 135*c* of the alignment film 112 and the transfer direction in FIGS. 8A and 8B, and the relationship between the projection patterns 135*d* of the alignment film 122 and the transfer direction in FIGS. 7A and 7B agrees with the relationship between the projection patterns 135*d* of the alignment film 122 and the transfer direction in FIGS. 8A and 8B. In other words, longer-side directions of the rectangular patterns of the projection patterns 135*c* and the projection patterns 135*d* are set to be perpendicular to the transfer direction of the alignment film 112 or the alignment film 122.

It is to be noted that, in a manner similar to the projection patterns 135*a* in the first preferred embodiment, the projection patterns 135*c* are made of the same material and have the same thickness as the insulating film 115 so as to be formed at the same time as the insulating film 115, which is disposed in the display region 100, through a step of forming the common organic resin film and a patterning step. It is also to be noted that, in a manner similar to the projection patterns 135*b* in the first preferred embodiment, the projection patterns 135*d* are made of the same material and have the same thickness as the sub-spacers 134*s* so as to be formed at the same time as the sub-spacers 134*s*, which is disposed in the display region 100, through a step of forming a common organic resin film and a patterning step.

As illustrated in FIGS. 7A, 7B, 8A, and 8B, a positional relationship between the uneven-surface formation region 135A, which includes the projection patterns 135*c* and the projection patterns 135*d*, and the formation region 112A of the alignment film 112 or the formation region 122A of the alignment film 122, a positional relationship between the uneven-surface formation region 135A and the formation position of the sealant 133, and other positional relationships are similar to the corresponding relationships concerning the projection patterns 135*a* and the projection patterns 135*b* in the first preferred embodiment. Although FIGS. 7A and 7B illustrate that the projection patterns 135*c* and the projection patterns 135*d* are arranged in three rows, the projection patterns 135*c* and 135*d* are actually required to be arranged in the uneven-surface formation region 135A in equal to or greater than ten rows or in a unit of several tens of rows. Such an actual arrangement is similar to that of the projection patterns 135*a* and the projection patterns 135*b* in the first preferred embodiment. Although FIGS. 8A and 8B illustrate that the projection patterns 135*c* and the projection patterns 135*d* are arranged in a single row, the projection patterns 135*c* and the projection patterns 135*d* may be arranged in multiple rows. Moreover, although FIGS. 8A and 8B illustrate that the projection patterns 135*c* and the projection patterns 135*d* are arranged in more than ten columns, the projection patterns 135*c* and 135*d* may be densely arranged in equal to or greater than several tens of columns.

The liquid crystal display according to the second preferred embodiment is configured in a manner similar to the liquid crystal display according to the first preferred embodiment. That is, the liquid crystal display according to the second preferred embodiment is provided with an overlap region between the sealant 133 and each of the alignment films 112 and 122. In this overlap region, each of the projection patterns 135*c* and the projection patterns 135*d* is disposed on the surface of the array substrate 110 or the CF substrate 120, thereby forming the uneven surface. Moreover, the liquid crystal display has a portion in which the sealant 133 is joined to the surface of the array substrate 110 or the CF substrate 120 in the outer periphery (outer edge portion) of the sealant 133, particularly, all over the sealant 133 without the alignment film 112 or the alignment film 122 interposed therebetween. Such a configuration enables design in which the distance between the formation position of the sealant 133 and the display region 100 is greatly reduced. This achieves the following effects: a narrowed-down frame at a relatively high level; minimization of a reduction in adhesion caused by the overlap between the sealant 133 and each of the alignment film 112 and the alignment film 122 in part of the formation region of the sealant 133; and a sufficient resistance to moisture. In short, both reliability and a narrowed-down frame are achieved at a relatively high level.

Further, in a manner similar to the liquid crystal display according to the first preferred embodiment, the liquid crystal display is configured such that the projection patterns 135*c* on the surface of the array substrate 110 and the projection patterns 135*d* on the surface of the CF substrate 120 are made of the same material and have the same thickness as the columnar spacers (to be specific, the sub-spacers 134*s*) on the TFTs 114 and the insulating film 115, which functions as a flattening film flattening on the surface of the substrate, where the columnar spacers and the insulating film 115 are disposed in the display region 100 in a typical liquid crystal display. Consequently, the projection patterns 135*c* and the projection patterns 135*d* are formed by the use of materials that are contained in the typical liquid crystal display. Moreover, the projection patterns 135*c* and the projection patterns 135*d* are formed at the same time as already-existing components included in the display region 100 through steps of forming films that form these components and patterning steps. This eliminates the need to prepare a particular material and eliminates an increase in manufacturing cost due to an increase in process step. Moreover, such a configuration achieves the following effects: display manufacture involves no process that is practically difficult to be employed; and the uneven surfaces are provided with steps that are effective to an increase in adhesion on the order of 1 to 3 µm.

Still further, the liquid crystal display according to the second embodiment is configured such that the projection patterns 135*c* and the projection patterns 135*d*, which are formed of the rectangular patterns having the longer-side directions, are arranged in such a manner that planar shapes of the projection patterns 135*c* and 135*d* are each oriented in a direction perpendicular to the transfer direction in the flexography during the application and formation of the alignment film material, which forms the alignment film 112 and the alignment film 122.

Here, an alignment film material can be applied, by the use of flexography, onto an uneven surface with cavities, more specifically, groove cavities each having a longer-side direction in a certain direction, if the longer-side direction of the groove cavity coincides with a transfer direction in the flexography, the alignment film material commonly extends to reach the inside of the cavity unless the cavity has an extremely narrow width. If the longer-side of the groove recess is perpendicular to the transfer direction in the flexography, the alignment film material is commonly difficult to extend to reach the inside of the cavity, and thus cannot be sufficiently applied to the inside of the cavity.

In the second preferred embodiment, the array substrate 110 have gaps (cavities) between the arranged projection patterns 135*c*; the CF substrate 120 have gaps (cavities) between the arranged projection patterns 135*d*. These gaps are set to have longer-slide directions perpendicular to the transfer direction in the vicinity of the sealant 133 around all the four sides of the rectangular array substrate 110 and the rectangular CF substrate 120. Hence, the alignment film 112 and the alignment film 122 are difficult to extend to the insides of the gaps between the projection patterns 135*c* and the insides of the gaps between the projection patterns 135*d*. As a result, the alignment film 112 and the alignment film 122 are thin or are scarcely formed particularly at the bottoms of the gaps (cavities) between the projection patterns 135*c* and at the bottoms of the gaps (cavities) between the projection patterns 135*d*. This further effectively prevents a reduction in adhesion between the uneven surfaces, which are formed by the projection patterns 135*c* and the projection patterns 135*d*, and the sealant 133, the reduction in adhesion being caused by the alignment film 112 and the alignment film 122 interposed between each of the projection patterns 135*c* and the projection patterns 135*d*, and the sealant 133.

It is to be noted that in the array substrate 110 and the CF substrate 120, transfer direct ions in the formation of the alignment film 112 and the alignment film 122 are each set to be a single particular direction. As such, in the second preferred embodiment, the direction in which the rectangular patterns of the projection patterns 135*c* and the projection patterns 135*d* extend, in the vicinity of the sealant 133 around one pair of parallel sides of the four sides of each of the rectangular array substrate 110 and the rectangular CF substrate 120, is different, by 90°, from the direction in which the rectangular patterns of the projection patterns 135*c* and the projection patterns 135*d* extend, in the vicinity of the sealant 133 around the other pair of parallel sides. Such an arrangement enables the transfer directions in the array substrate 110 and the CF substrate 120 to be directions in which the alignment films are difficult to extend to the cavities, as appropriate, thereby achieving the aforementioned effects.

A different advantage is obtained when the longer-side directions of the rectangular patterns of the projection patterns 135*c* and the rectangular patterns of the projection patterns 135*d* coincide with the direction in which the sealant 133 extends, which has been already described with reference to FIGS. 7A and 7B. In this case, the outer ends of the alignment film 112 and the alignment film 122 are parallel with the longer-side directions of the rectangular patterns of the projection patterns 135*c* and the rectangular patterns of the projection patterns 135*d*. Meanwhile, as detailed in the first preferred embodiment, it is important to position e outer ends of the alignment film 112 and the alignment film 122 so as not to extend to the outside of the sealant 133, in order to achieve a resistance to moisture and minimizes the reduction in adhesion of the sealant 133. To do this, as mentioned earlier, the outer ends of the alignment film 112 and the alignment film 122 are arranged to be parallel with the rectangular patterns of the projection patterns 135*c* and the projection patterns 135*d*. Such an arrangement hinders the outer ends of the alignment film 112 and the alignment film 122 from extending across the uneven-surface formation region 135A, in which the projection patterns 135*c* and the projection patterns 135*d* are disposed. In other words, such an arrangement hinders the outer ends of the alignment film 112 and the alignment film 122 from extending to the outside of the sealant 133, thereby preventing the outer ends from extending to the outside of the sealant 133. Consequently, such an arrangement assists a portion in which the sealant 133 is joined to the surface of the array substrate 110 or the CF substrate 120 without the alignment film 112 or the alignment film 122 interposed therebetween, to be further certainly allocated.

In the second preferred embodiment, as mentioned earlier with reference to FIGS. 8A and 8B, the longer-side directions of the rectangular patterns of the projection patterns 135*c* and the rectangular patterns of the projection patterns 135*d* are set by placing emphasis on the positional relationship with the transfer directions of the alignment film 112 and the alignment film 122. Hence, in some portions, the longer-side directions of the rectangular patterns of the projection patterns 135*c* and the rectangular patterns of the projection patterns 135*d* do not coincide with the direction in which the sealant 133 extends.

Accordingly, the longer-side directions of the rectangular patterns of the projection patterns 135*c* and the rectangular patterns of the projection patterns 135*d* may conversely parallel to the direction in which the sealant 133 extends with respect to all the sides, regardless of the transfer direction of the alignment film 112 and the alignment film 122, as illustrated in FIGS. 7A and 7B, if these longer-side directions are set by placing emphasis on the effect of preventing the outer ends of the alignment film 112 and the alignment film 122 from extending to the outside of the sealant 133 with respect to all the sides. Such an arrangement prevents the outer ends of the alignment film 112 and the alignment film 122 from extending to the outside of the sealant 133, thereby, in particular, more effectively achieving the resistance to moisture and more effectively minimizing the reduction in adhesion of the sealant 133.

It is to be noted that as mentioned earlier, the longer-side directions of the rectangular patterns of the projection patterns 135*e* and the rectangular patterns of the projection patterns 135*d* can be coincide with the direction in which the sealant 133 extends, with respect to all the sides regardless of the transfer direction of the alignment film 112 and the alignment film 122. In this case, some regions can have locations in which the transfer direction of the alignment film 112 and the alignment film 122 coincides with the longer-side directions of the rectangular patterns of the projection patterns 135*c* and the rectangular patterns of the projection patterns 135*d*. In these regions, other countermeasures may be taken for the gaps (cavities) between the projection patterns 135*c* and between the projection patterns 135*d* in order for the alignment film 112 and the alignment film 122 to be difficult to extend to the insides of the gaps.

To be specific, the gaps (cavities) between the projection patterns 135*c* and between the projection patterns 135*d* are required to have a small interval in these regions, in which the transfer direction coincides with the longer-side directions of the rectangular patterns of the projection patterns 135c and the rectangular patterns of the projection patterns 135d; that is, each recess is required to have a smaller width than the projection patterns 135c and 135d disposed in the vicinity of the sealant 133 around sides that do not satisfy the aforementioned relationship. Doing so achieves the configuration described in the second preferred embodiment, in which the alignment film 112 and the alignment film 122 are difficult to extend to the insides of the gaps (cavities) between the projection patterns 135c and between the projection patterns 135d, in the vicinity of the sealant 133 around all the four sides of the rectangular array substrate 110 and the CT substrate 120. In other words, doing so more effectively prevents the reduction in adhesion caused by the alignment film 112 and the alignment film 122 interposed between each of the uneven surfaces, which are formed of the projection patterns 135c and the projection patterns 135d, and the sealant 133.

Third Preferred Embodiment

The following describes a liquid crystal display according to a third preferred embodiment that is generally configured in the same manner as the liquid crystal display according to the second preferred embodiment with the following exception: a change is made to the configuration of individual rectangular patterns that are provided for forming uneven surfaces on the array substrate 110 and the CF substrate 120, in an overlap between the sealant 133 and the formation region 112A of the alignment film 112 or the formation region 122A of the alignment film 122 in the frame region 101, and in particular, a change is made to the configuration of projection patterns 135c on the array substrate 110. The following mainly describes this change.

Figure 10:
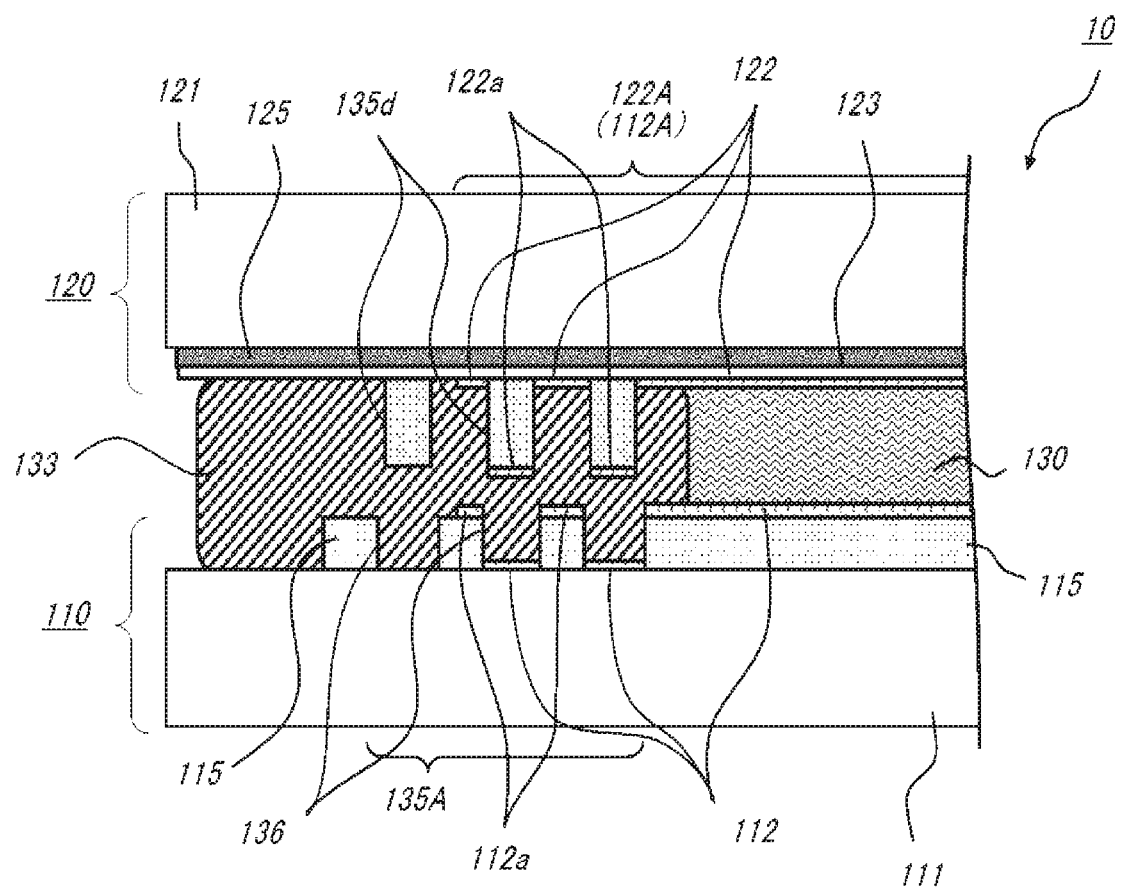
FIG. 10 is a cross-sectional view of a main part of a liquid crystal panel of the liquid crystal display according to the third preferred embodiment of the present invention.

With reference to FIGS. 9A, 9B, and 10, described is a configuration of recess patterns 136 and a configuration of the projection patterns 135d, both projection patterns being provided for forming uneven surfaces on the array substrate 110 and the CF substrate 120. These configurations are characteristic configurations of the liquid crystal display according to the third preferred embodiment. FIGS. 9A and 9B are detailed plan views of main parts of the liquid crystal display. FIG. 9A is a plan view of the CF substrate 120; and FIG. 9B, a plan view of the array substrate 110. In particular, FIGS. 9A and 9B correspond to FIGS. 7A and 7B in the second preferred embodiment. Arrows in the drawings each denote a transfer direction in applying and forming the alignment film material, which forms the alignment film 112 or the alignment film 122. In a manner similar to FIGS. 7A and 7B in the second preferred embodiment, the transfer direction is set to be perpendicular to a direction in which the sealant 133 extends. FIG. 10 is a detailed cross-sectional view of the main part of the liquid crystal display, and corresponds to FIG. 3A in the first preferred embodiment.

The liquid crystal display according to the third preferred embodiment is configured such that the recess patterns 136 are arranged on the surface of the array substrate 110, and the projection patterns 135d are arranged on the surface of the CF substrate 120, so that the array substrate 110 or the CF substrate 120 have uneven surfaces on their surfaces in the overlap between the sealant 133 and the formation region 112A of the alignment film 112 or the formation region 122A of the alignment film 122 in the frame region 101. As illustrated in FIGS. 9A and 9B, each of the recess patterns 136 and each of the projection patterns 135d is generally formed of a rectangular pattern, and a plurality of recess patterns 136 and a plurality of projection patterns 135d are arranged. In other words, the projection patterns 135d are arranged on the CF substrate 120 in the same manner as the second preferred embodiment. However, the recess patterns 136 are formed of rectangular patterns that are cavities. This is a change from the second preferred embodiment.

More specifically, the projection patterns 135d on the surface of the CF substrate 120 are made of the same material and have the s thickness as the sub-spacers 134s so as to be formed at the same time as the sub-spacers 134s, which are arranged in the display region 100, through a step of forming a common organic resin film and a patterning step, in a manner similar to the projection patterns 135d in the second preferred embodiment.

Meanwhile, the recess patterns 136 on the surface of the array substrate 110 are formed at the same time as the insulating film 115, which is disposed in the display region 100, through a step of forming a common organic resin film and a patterning step. More specifically, the recess patterns 136 are formed at the same time as the TFTs 114, which are covered by the insulating film 115, which is a flattening film, through a patterning step for forming contact holes formed by making openings on the insulating film 115 in order to connect the pixel electrodes 113 together. In other words, a method for manufacturing the liquid crystal display according to the third preferred embodiment requires to include a step of making the openings on the insulating film 115 to form the contact holes particularly in the step of patterning the insulating film 115, which is performed in the method of manufacturing the mother array substrate in the method for manufacturing the liquid crystal display according to the first preferred embodiment, and of simultaneously forming the recess patterns 136. Then, the insulating film 115 remains from the display region 100 to the frame region 101, in particular, to the uneven-surface formation region 135A in which the recess pattern 136 and the projection pattern 135d are disposed. Accordingly, the recess patterns 136 are disposed on the insulating film 115 remaining in the frame region 101 as vacant patterns. In other words, the recess patterns 136, although being the vacant patterns, are made of the same material and have the same thickness (the same height) as the insulating film 115, which is disposed in the display region 100.

As seen from FIGS. 9A, 9B, and 10, the rectangular patterns of the recess patterns 136 are each set to have an outer shape slightly greater than an outer shape of each rectangular pattern of the projection pattern 135d. That is, as illustrated in the cross-sectional view of FIG. 10, a formation position of the projection patterns 135d on the surface of the CF substrate 120 coincides with a formation position of the recess patterns 136 on the surface of the array substrate 110; however, the projection patterns 135d and the recess patterns 136 are arranged in a staggered manner when viewed as protrusions on the surfaces of the array substrate 110 and the CF substrate 120. As a result, gaps between the projection patterns 135d and the recess patterns 136 are relatively wide; in addition, the sealant 133 is disposed in the relatively wide gaps. Such a configuration enables the sealant 133 to sufficiently function with respect to the adhesion between the projection patterns 135d and the recess patterns 136, thereby further improving a joining strength between the sealant 133, and each of the array substrate 110 and the CF substrate 120.

As mentioned earlier, the protrusions on the surfaces of the array substrate 110 and the CF substrate 120 are arranged in a staggered manner. By virtue of this arrangement, the projection patterns 135*d* do not abut the surface of the array substrate 110 if projection patterns 135*d* are made of the same material and have the same thickness as the main spacers 134*m*. In addition, gaps are produced between the projection patterns 135*d* and the bottoms of the cavities of the recess patterns 136; the sealant 133 is disposed in the gaps. Accordingly, the joining strength of the sealant 133 functions in the adhesion between the projection patterns 135*d* and the bottoms of the cavities of the recess patterns 136, thereby improving the joining strength between the sealant 133, and each of the array substrate 100 and the CF substrate 120.

In other words, in the third preferred embodiment, the projection pattern 135*d* may be made of the same material and have the same thickness as the main spacers 134*m*. Such a configuration improves the joining strength between the sealant 133, and each of the array substrate 110 and the CF substrate 120, in a manner similar to the configuration of the third preferred embodiment, in which the projection patterns 135*d* are made of the same material and have the same thickness as the sub-spacers 134*s*, or in a manner similar to the configurations in the first and second preferred embodiments. Further, the projection patterns 135*d* are made of the same material and have the same thickness as the main spacers 134*m*. This configuration is applicable to a configuration in which the sub-spacers 134*s* are not included, i.e., a configuration having no dual-spacer structure.

Further, in the third preferred embodiment, the drawings illustrate only portions in which the transfer directions are set to be perpendicular to the direction in which the sealant 133 extends. Reference is made to longer-side directions of the rectangular patterns of the projection patterns 135*d* and the rectangular patterns of recess patterns 136 in a portion in which the transfer direction is set to be parallel to the direction in which the sealant 133 extends. These longer-side directions may be set to be perpendicular to the direction in which the sealant 133 extends, in a manner similar to those in the second preferred embodiment. Alternatively, these longer-side directions may be set to be parallel to the direction in which the sealant 133 extends, in a manner similar to those in the modification of the second preferred embodiment.

In the former case, the alignment film 112 and the alignment film 122 are difficult to extend to the insides of the individual cavities of the projection patterns 135*d* and the recess patterns 136. This effectively prevents a reduction in adhesion caused by the alignment film 112 and the alignment film 122 interposed between the sealant 133 and the uneven surfaces, which is formed of the projection patterns 135*d* and the recess patterns 136. In the latter case, the outer ends of the alignment film 112 and the alignment film 122 are prevented from extending to the outside of the sealant 133. This achieves a sufficient resistance to moisture and minimizes the reduction in adhesion of the sealant 133. In other words, either configuration is required to be selected in, accordance with, for instance, uses.

The third preferred embodiment describes that the projection patterns 135*d* on the surface of the CF substrate 120 are made of the same material and have the same thickness as the sub-spacers 134*s* in the second preferred embodiment and that the rectangular patterns form the protrusions, which not changed from the second preferred embodiment. Reference is made to the organic resin film disposed on the CF substrate 120, the organic resin film being made of the same material and having the same thickness as the sub-spacers 134*s*. The organic resin film generally remains from the display region 100 to the frame region 101, and particularly, to the uneven-surface formation region 135A. In some embodiments, the organic resin film made of the same material and has the same thickness as the sub-spacers 134*s*, which is disposed in the frame region 101, may be processed into vacant patterns; then, recess patterns are provided in which rectangular patterns form cavities. In this case, the recess patterns are required to be formed at the same time in a step of patterning the organic resin film, which forms the main spacers 134*m* and the sub-spacers 134*s*, in the method for manufacturing the liquid crystal display according to the first preferred embodiment, particularly, in the method of manufacturing the mother CF substrate.

In a manner similar to the liquid crystal displays according to the first and second preferred embodiments, the liquid crystal display according to the third preferred embodiment is provided with an overlap between the sealant 133, and each of the alignment film 112 and the alignment film 122. In this overlap, the uneven surface is formed on the surface of the array substrate 110 or the CF substrate 120. Further, the liquid crystal display according to the third preferred embodiment has a portion in which the sealant 133 is joined to the surface of the array substrate 110 or the CF substrate 120 without the alignment film 112 or the alignment film 122 interposed therebetween, in the outer periphery (outer edge portion) of the sealant 133, particularly, all over the sealant 133. Such a configuration achieves both reliability and a narrowed-down frame at a relatively high level.

Still further, the liquid crystal display according to the third preferred embodiment is configured such that the recess patterns 136 on the surface of the array substrate 110 and the projection patterns 135*d* on the surface of the CF substrate 120 are made of the same materials as columnar spacers (to be specific, the sub-spacers 134*s*) in the display region 100 and as the insulating film 115, which functions as a flattening film flattening the surface of the substrate on the TFTs 114 in the frame region 100, where the columnar spacers and the TFTs are disposed in the frame region in a typical liquid crystal display. Consequently, the recess patterns 136 and the projection patterns 135*d* are formed by the use of materials that are used in the typical liquid crystal display. Moreover, the recess patterns 136 and the projection patterns 135 are formed at the same time as already-existing components included in the display region 100 through steps of forming films that form these components and patterning steps. This eliminates the need to prepare a particular material and eliminates an increase in manufacturing cost due to an increase in process step. Moreover, such a configuration achieves the following effects: display manufacture involves no process that is practically difficult to be employed; and the uneven surfaces are provided with steps that are effective to an increase in adhesion on the order of 1 to 3 µm.

Fourth Preferred Embodiment

The following describes a liquid crystal display according to a fourth preferred embodiment that is generally configured in the same manner as the liquid crystal display according to the first preferred embodiment with the following exception: a change is made to a configuration of individual patterns that are provided for forming uneven surfaces on the array substrate 110 and the CF substrate 120, in an overlap between the sealant 133 and the formation region 112A of the alignment film 112 or the formation region 122A of the alignment film 122 in the frame region 101. The following mainly describes this change.

Figure 11A:
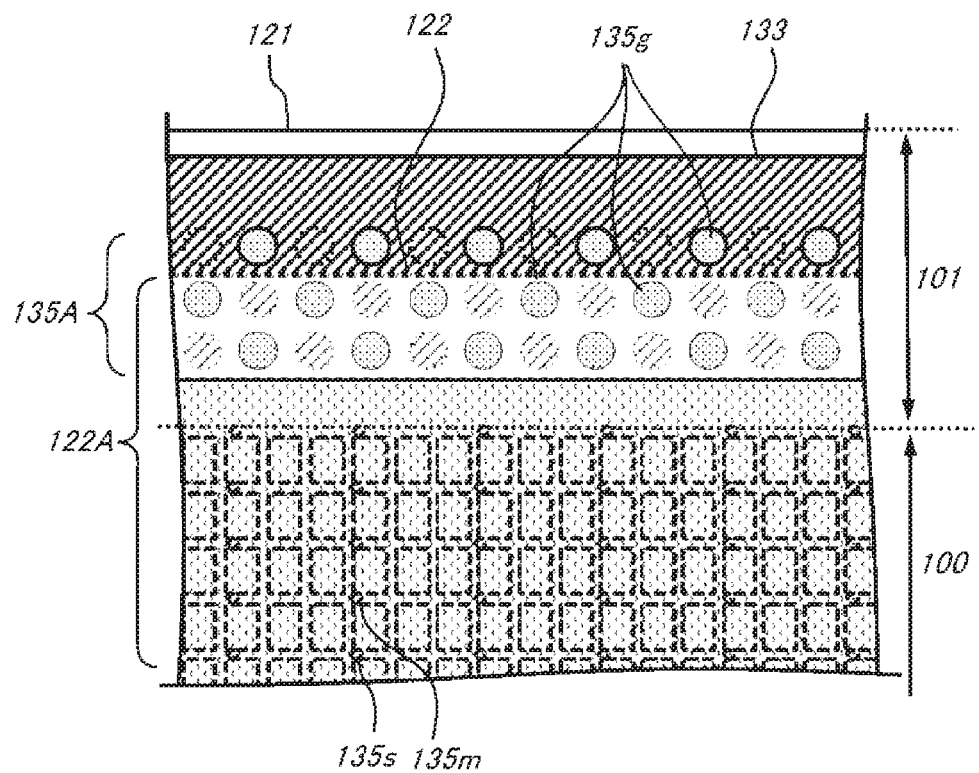
FIGS. 11A and 11B are plan views of main parts of a color filter substrate and an array substrate of a liquid crystal display according to a fourth preferred embodiment of the present invention.
Figure 11B:
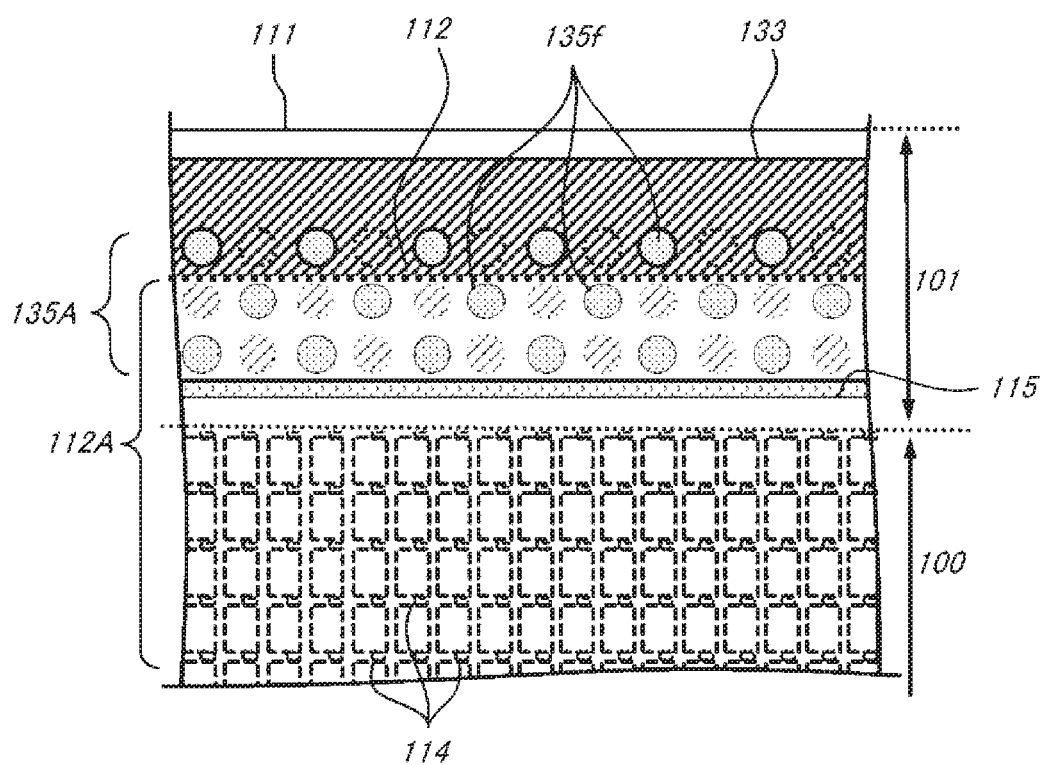

With reference to FIGS. 11A and 11B, a configuration will be described in which projection patterns 135f and projection patterns 135g that are provided for forming uneven surfaces on the array substrate 110 and the CF substrate 120. This configuration is a characteristic configuration of the liquid crystal display according to the fourth preferred embodiment. FIGS. 11A and 11B are detailed cross-sectional views of main parts of the liquid crystal display, and correspond to FIGS. 4A and 4B in the first preferred embodiment. FIG. 11A is a plan view of the CF substrate 120. FIG. 11B is a plan view of the array substrate 110.

The liquid crystal display according to the fourth embodiment is configured such that projection patterns 135f are arranged on the surface of the array substrate 110, and that projection patterns 135g are arranged on the surface of the CF substrate 120, in the overlap between the sealant 133, and the formation region 112A of the alignment film 112 or the formation region 122A of the alignment film 122 in the frame region 101 so that the uneven surfaces are formed on the surfaces of the array substrate 110 and the CF substrate 120. As illustrated in FIG. 11A, i.e., the plan view of the CF substrate 120 in the frame region 101, the projection patterns 135f are circular in plan view and are arranged in the uneven-surface formation region 135A in longitudinal and transverse directions of the drawing. As illustrated in FIG. 11B, i.e., the plan view of the array substrate in the frame region 101, the projection patterns 135g are circular in plan view and are arranged in the uneven-surface formation region 135A in longitudinal and transverse directions of the drawing. Each arrangement in the longitudinal and transverse directions includes vacancies (locations having no projection patterns) indicated by dotted-line circles. A single projection pattern 135f or a single projection pattern 135g is adjacent to these vacancies on its top, down, right, and left sides.

Let the positions of the projection patterns 135g on the CF substrate 120 overlap the positions of the projection patterns 135f on the array substrate 110. Accordingly, the positions of the projection patterns 135g correspond to the positions of the vacancies of the projection patterns 135f; and the positions of the projection patterns 135f, to the positions of the vacancies of the projection patterns 135g. Thus, the projection patterns 135g and the projection patterns 135f are arranged in a staggered manner.

It is to be noted that, in a manner similar to the projection patterns 135a in the first preferred embodiment, the projection patterns 135f are made of the same material and have the same thickness as the insulating film 115 so as to be formed at the same time as the insulating film 115, which is disposed in the display region 100, through a step of forming a common organic resin film and a patterning step. It is also noted that, in a manner similar to the projection patterns 135b in the first preferred embodiment, the projection patterns 135g are made of the same material and have the same thickness as the sub-spacers 134s so as to be formed at the same time as the sub-spacers 134s, which are disposed in the display region 100, through a step of forming a common organic resin film and a patterning step.

As illustrated in FIGS. 11A and 11B, a positional relationship between the uneven-surface formation region 135A that includes the projection patterns 135f and the projection patterns 135g, and the formation region 112A of the alignment film 112 or the formation region 122A of the alignment film 122, a positional relationship between the uneven-surface formation region 135A and the formation position of the sealant 133, and other positional relationships are similar to the corresponding relationships concerning the projection patterns 135a and the projection patterns 135b in the first preferred embodiment. Although FIGS. 11A and 11B illustrate that the projection patterns 135f and the projection patterns 135g are arranged in three rows, the projection patterns 135f and 135g are actually required to be arranged within the uneven-surface formation region 135A in equal to or greater than ten rows or in a unit of several tens of rows. Such an actual arrangement is similar to that of the projection patterns 135a and the projection patterns 135b in the first preferred embodiment.

In a manner similar to the liquid crystal display according to the first, second or third preferred embodiment, the liquid crystal display according to the fourth preferred embodiment is provided with an overlap between the sealant 133, and each of the alignment film 112 and the alignment film 122. In this overlap, the uneven surface is formed on the surface of the array substrate 110 or the CF substrate 120. Further, the liquid crystal display according to the fourth preferred embodiment has a portion in which the sealant 133 is joined to the surface of the array substrate 110 or the CF substrate 120 without the alignment film 112 or the alignment film 122 interposed therebetween, in the outer periphery (outer edge portion) of the sealant 133, particularly, all over the sealant 133. Such a configuration achieves both reliability and a narrowed-down frame at a relatively high level.

Still further, in a manner similar to the liquid crystal display according to the first, second or third preferred embodiment, the liquid crystal display according to the fourth preferred embodiment is configured such that the projection patterns 135f on the surface of the array substrate 110 and the projection patterns 135g on the surface of the CF substrate 120 are made of the same materials and have the same thicknesses as columnar spacers (to be specific, the sub-spacers 134s) in the display region 100 and as the insulating film 115, which functions as a flattening film flattening the surface of the substrate on the TFTs 114 in the frame region 100, where the columnar spacers and the TFTs are disposed in a frame region in a typical liquid crystal display. Consequently, the projection patterns 135f and the projection patterns 135g are formed by the use of materials that are used in the typical liquid crystal display. Moreover, the projection patterns 135f and the projection patterns 135g are formed at the same time as already-existing components included in the display region 100 through steps of forming films that form these components and patterning steps. This eliminates the need to prepare a particular material and eliminates an increase in manufacturing cost due to an increase in process step. Moreover, such a configuration achieves the following effects: display manufacture involves no process that is practically difficult to be employed; and the uneven surfaces are provided with steps that are effective to an increase in adhesion on the order of 1 to 3 μm.

Reference is made to the arrangement of the projection patterns 135f on the surface of the array substrate 110 and the arrangement the projection patterns 135g on the surface of the CIF substrate 120, in the fourth preferred embodiment. These projection patterns, when viewed as protrusions on the surfaces of the array substrate 110 and the CF substrate 120, are arranged in a staggered manner. As a result, the sealant 133 is disposed in a gap between each projection pattern 135f and the vacancy of each projection pattern 135g or a gap between each projection pattern 135g and the vacancy of each projection pattern 135f; in addition, the sealant 133 is provided to fill the gaps disposed, in a complex manner, between the projection patterns 135f and the projection patterns 135g, which are arranged in a staggered manner. Such a configuration enables the sealant 133 to particularly effectively function in adhesion of the staggered arrangement of the projection patterns 135f and the projection patterns 135g, thereby further improving a joining strength between the sealant 133, and each of the array substrate 100 and the CF substrate 120.

Fifth Preferred Embodiment

The following describes a liquid crystal display according to a fifth preferred embodiment that is generally configured in the same s the liquid crystal display according to the first preferred embodiment with the following exception: a change is made to a configuration of individual patterns that are provided for forming uneven surfaces on the array substrate 110 and the CF substrate 120, in an overlap between the sealant 133 and the formation region 112A of the alignment film 112 or the formation region 122A of the alignment film 122 in the frame region 101. The following mainly describes this change.

Figure 13A:
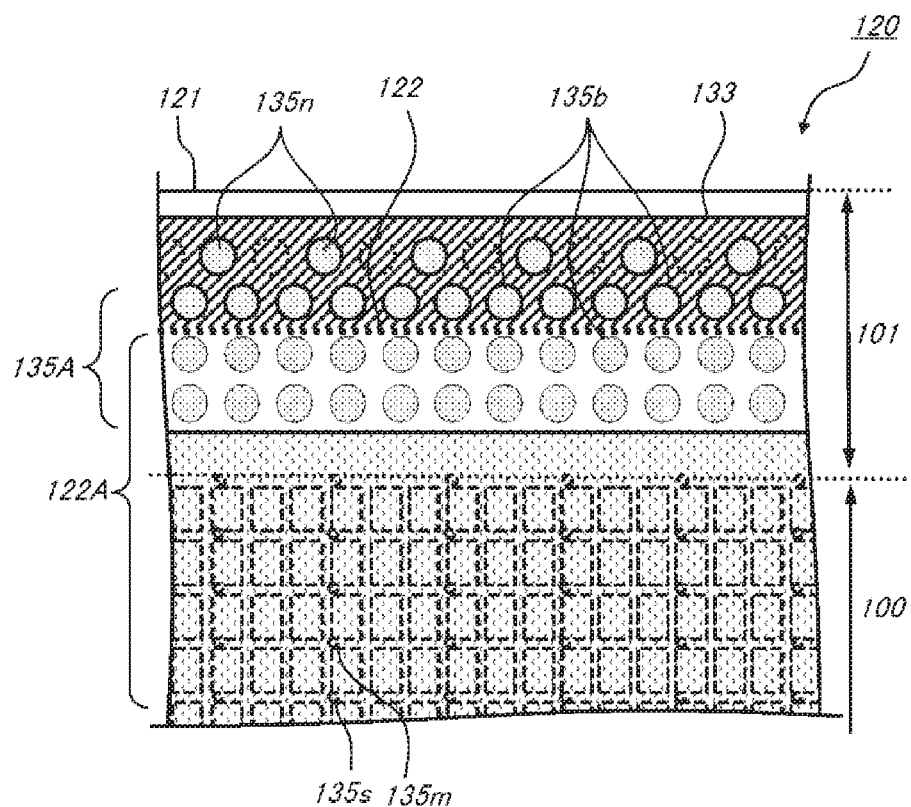
FIGS. 13A and 13B are plan views of main parts of a color filter substrate and an array substrate of a liquid crystal display according to a second modification of the fifth preferred embodiment of the present invention.
Figure 13B:
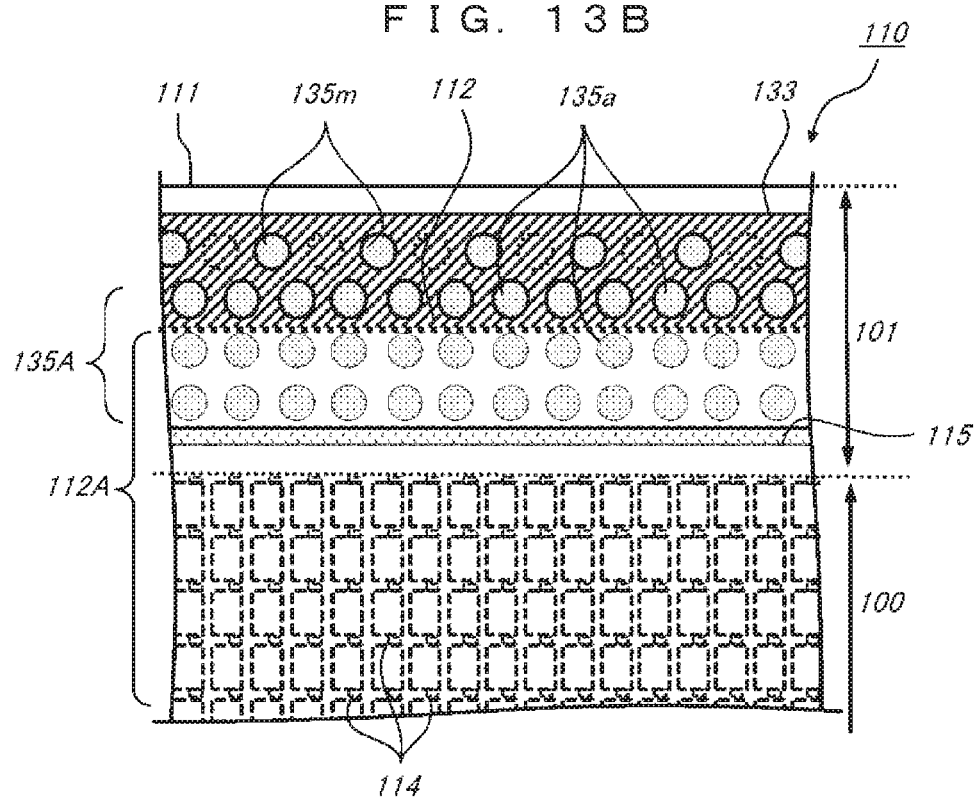

To be specific, the change in the fifth preferred embodiment is that the liquid crystal display includes different projection patterns disposed in the outer edge portion of the sealant 133 as well as the projection patterns 135a and 135b in the first preferred embodiment, which are provided for forming the uneven surfaces on the surfaces of the array substrate 110 and the CF substrate 120. It is noted that the liquid crystal display according to the first preferred embodiment does not include these different projection patterns in the outer edge portion of the sealant 133. A first modification will be described with reference to FIGS. 12A and 12B; and a second modification, to FIGS. 13A and 13B. FIG. 12A and FIG. 13A are plan views of the CF substrate 120. FIG. 12B and FIG. 13B are plan views of the array substrate 110.

Reference is made to a liquid crystal display according to the first modification of the fifth preferred embodiment. As illustrated in FIGS. 12A and 12B, the projection patterns 135a are arranged on the surface of the array substrate 110, and the projection patterns 135b are arranged on the surface of the CF substrate 120, in the overlap between the sealant 133 and the formation region 112A of the alignment film 112 or the formation region 122A of the alignment film 122 in the frame region 101, so that the uneven surfaces are formed on the surfaces of the array substrate 110 and the CF substrate 120. Further, a plurality of projection patterns 135a and a plurality of projection patterns 135b each formed of a circular pattern are arranged. Such a configuration is similar to the corresponding configuration in the first preferred embodiment.

In particular, the liquid crystal display according to the first modification is configured such that, in the outer edge portion of the sealant 133, projection patterns 135h are arranged on the surface of the array substrate 110, and the projection patterns 135k are arranged on the surface of the CF substrate 120. Further, as illustrated in the drawings, plurality of projection patterns 135b and a plurality of projection patterns 135k are arranged, each of which is formed of a circular pattern having an outer size smaller than an outer size of the circular pattern of the projection pattern 135a or the projection pattern 135b, which is disposed in the formation region 112A of the alignment film 112 or the formation region 122A of the alignment film 122. More specifically, a plurality of projection patterns 135b and a plurality of projection patterns 135k are arranged, each of which is formed of a circular pattern having a diameter smaller than a diameter of the circular patter of the projection pattern 135a or the projection pattern 135b.

As illustrated in the drawings, the projection patterns 13511 on the array substrate 110 and the projection patterns 135k on the CF substrate 120 are arranged in such a manner that a planar arrangement of the projection patterns 135k coincides with a planar arrangement of the projection patterns 135k. Herein, examples of each planar arrangement include an outer size, a diameter, if the patterns are circular, a distance of an arrangement interval, and a planar position.

It is to be noted that, in a manner similar to the projection patterns 135a in the first preferred embodiment, the projection patterns 135h, which are formed of the circular patterns each having a small diameter, the circular patterns being arranged in the outer edge portion of the sealant 133, are made of the same material and have the same thickness as the insulating film 115 so as to be formed at the same time as the insulating film 115, which is disposed in the display region 100, through a step of forming a common organic rosin film and a patterning step. It is also to be noted that, in a manner similar to the projection patterns 135b in the first preferred embodiment, the projection patterns 135k, which are formed of the circular patterns each having a small diameter, the circular patterns being arranged in the outer edge portion of the sealant 133, are made of the same material and have the same thickness as the sub-spacers 134s so as to be formed at the same time as the sub-spacers 134s, which are arranged in the display region 100, through a step of forming a common organic resin film and a patterning step.

As illustrated in FIGS. 12A and 12B, a positional relationship between the uneven-surface formation region 135A, which includes the projection patterns 135a and the projection patterns 135b, and the formation region 112A of the alignment film 112 or the formation region 122A of the alignment film 122, a positional relationship between the uneven-surface formation region 135A and the formation position of the sealant 133, and other positional relationships are similar to the corresponding relationships concerning the projection patterns 135a and the projection patterns 135b in the first preferred embodiment. As illustrated in the drawings, the projection patterns 135b and the projection patterns 135k, which are arranged in the outer edge portion of the sealant 133 and formed of the circular patterns each having a small diameter, are arranged outside the formation region 112A of the alignment film 112 or the formation region 122A of the alignment film 122. It is to be noted that the projection patterns 135b and the projection patterns 135k, although being arranged in a single row in FIGS. 12A, and 12B, may actually arranged in a plurality of rows.

The formation region 122A is desirably designed so as not to overlap the projection patterns 135b and the projection patterns 135k in view of variations in manufacturing the formation region 122A of the alignment film 112 or the alignment film 122. However, the formation region 122A may overlap the projection patterns 135b and the projection patterns 135k within these variations only if the following condition is satisfied. Such a condition is that the alignment film 112 and the alignment film 122 are not disposed in the outer edge portion of the sealant 133 and in the frame region 101 outside the formation region of the sealant 133; that is, a portion in which the sealant 133 is joined to the surface of the array substrate 110 or the CF substrate 120 is disposed in the outer periphery (outer edge portion) of the sealant 133, particularly, all over the sealant 133 without the alignment film 112 and the alignment film 122 interposed therebetween.

Reference is now made to a liquid crystal display according to the second modification of the fifth preferred embodiment. As illustrated in FIGS. 13A and 13B, the projection patterns 135a are arranged on the surface of the array substrate 110, and the projection patterns 135b are arranged on the surface of the CF substrate 120, in the overlap between the sealant 133 and the formation region 112A of the alignment film 112 or the formation region 122A of the alignment film 122 in the frame region 101, so that the uneven surfaces are formed on the surfaces of the array substrate 110 and the CF substrate 120. Further, a plurality of projection patterns 135a and a plurality of projection patterns 135b each formed of a circular pattern are arranged. Such a configuration is similar to the corresponding configuration in the first preferred embodiment or the corresponding configuration in the first modification of the fifth preferred embodiment.

In particular, the liquid crystal display according to the second modification is configured such that, in the outer edge portion of the sealant 133, projection patterns 135m are arranged on the surface of the array substrate 110, and projection patterns 135n are arranged on the surface of the CF substrate 120. Further, as illustrated in the drawings, a plurality of projection patterns 135m and a plurality of projection patterns 135n are arranged, each of which is formed of a circular pattern having the same diameter as the projection patterns 135a or the projection patterns 135b, which are arranged in the formation region 112A of the alignment film 112 or the formation region 122A of the alignment film 122. Moreover, the plurality of projection patterns 135m and the plurality of projection patterns 135n are arranged in lower density than the arrangement of the projection patterns 135a or the arrangement of the projection patterns 135b.

Still further, the projection patterns 135m are arranged in a transverse direction of the drawing; the projection patterns 135n are arranged in a transverse direction of the drawing. Each arrangement in the transverse direction includes vacancies (locations having no projection patterns) indicated by dotted-line circles. A single projection pattern 135m or a single projection pattern 135n is adjacent to these vacancies on its right and left sides. Here, let the positions of the projection patterns 135n on the CF substrate 120 overlap the positions of the projection patterns 135m on the array substrate 110. Accordingly, the positions of the projection patterns 135n correspond to the positions of the vacancies of the projection patterns 135m; and the positions of the projection patterns 135m, to the positions of the vacancies of the projection patterns 135n. Thus, the projection patterns 135m and the projection patterns 135n are arranged in a staggered manner.

It is to be noted that the projection patterns 135m and the projection patterns 135n, which are arranged in the formation regions outside the sealant 133 in low density in a staggered manner, are configured in a manner similar to the projection patterns the first modification. That is, the projection patterns 135m are made of the same material and have the same thickness as the insulating film 115 so as to be formed at the same time as the insulating film 115, which is disposed in the display region 100, through a step of forming a common organic resin film and a patterning step, in addition, the projection patterns 135n are made of the same material and have the same thickness as the sub-spacers 134s so as to be formed at the same time as the sub-spacers 134s, which are arranged in the display region 100, through a step of forming a common organic resin and a patterning step.

As illustrated in FIGS. 13A and 13B, a positional relationship between the uneven-surface formation region 135A, which includes the projection patterns 135a and the projection patterns 135b, and the formation region 112A of the alignment film 112 or the formation region 122A of the alignment film 122, a positional relationship between the uneven-surface formation region 135A and the formation position of the sealant 133, and other positional relationships are similar to the corresponding relationships concerning the projection patterns 135a and the projection patterns 135b in the first preferred embodiment or the first modification. As illustrated in FIGS. 13A and 13B, the projection patterns 135m and the projection patterns 135n, which are arranged in formation region outside the sealant 133 in low density in a staggered manner, are arranged outside the formation region 112A of the alignment film 112 and the formation region 122A of the alignment film 122. It is to be noted that the projection patterns 135m, and the projection patterns 135n, although being arranged in a single row in FIGS. 13A and 13B, may actually arranged in a plurality of rows. In this case, the projection patterns 135m and the projection patterns 135n may be arranged in a plurality of rows in a staggered manner, in a manner similar to the projection patterns 135f and the projection patterns 135g in the fourth preferred embodiment.

In the above example of the projection patterns 135m and the projection patterns 135n, which are arranged in the formation region outside the sealant 133 in low density, the position of the projection patterns 135n on the CF substrate 120 differs from the position of the projection patterns 135m on the array substrate 110, and the projection patterns 135m and the projection patterns 135n are thus arranged in a staggered manner. In some embodiments, the projection patterns 135m and the projection patterns 135n are arranged in low density in such a manner that a planar arrangement (planar position) of the projection patterns 135n on the CF substrate 120 coincides with a planar arrangement (planar position) of the projection pattern 135m on the array substrate 110, in the same manner as the projection patterns 135b and 135k in the first modification, which are formed of the circular patterns each having a small diameter.

Reference is again made to the projection patterns 135h and 135k in the first modification, which are formed of the circular patterns each having a small diameter. The projection patterns 135h and the projection patterns 135k are arranged at wide intervals. Accordingly, a planar arrangement (planar position) of the projection patterns 135k on the CF substrate 120 may differ from a planar arrangement (planar position) of the projection patterns 135h on the array substrate 110, and the projection patterns 135k on the CF substrate 120 and the projection patterns 135h on the array substrate 110 may be thus arranged in a staggered manner.

In a manner similar to the liquid crystal display according to the first, second, third, or fourth preferred embodiment, the liquid crystal display according to the fifth preferred embodiment is provided with an overlap in which the sealant 133 partly overlaps each of the alignment film 112 and the alignment film 122. In this overlap, the uneven surface is formed on the surface of the array substrate 110 or the CF substrate 120. Further, the liquid crystal display according to the fifth preferred embodiment has a portion in which the sealant 133 is joined to the surface of the array substrate 110 or the CF substrate 120 without the alignment film 112 and the alignment film 122 interposed therebetween, in the outer periphery (outer edge portion) of the sealant 133, particularly, all over the sealant 133. Such a configuration achieves both reliability and a narrowed-down frame at a relatively high level.

It is to be noted that although, in the fifth preferred embodiment, the outer periphery of the sealant 133 has the additional projection patterns, which form the uneven surfaces on the surface of the array substrate 110 or the CF substrate 120, the aforementioned effects are similarly achieved. This is because, as mentioned earlier, the liquid crystal display according to the fifth preferred embodiment has a portion in which the sealant 133 is joined to the surface of the array substrate 110 or the CF substrate 120 without the alignment film 112 and the alignment film 122 interposed therebetween, in the outer periphery (outer edge portion) of the sealant 133, particularly, all over the sealant 133, which in turn is the same configuration as the liquid crystal display according to the first, second, third, or fourth preferred embodiment.

In the first and second modifications, the individual projection patterns on the surface of the array substrate 110 (i.e., the projection patterns 135*a*, the projection patterns 135*h*, and the projection patterns 135*m*), or the individual projection patterns on the surface of the CF substrate 120 (i.e., the projection patterns 135*b*, the projection patterns 135*k*, and the projection patterns 135*n*) are made of the same material and have the same thickness as the columnar spacers (to be specific, the sub-spacers 134*s*) or the insulating film 115, which functions as a flattening film flattening the surface of the substrate on the TFTs 114, where the columnar spacers and the insulating film 115 are disposed in the display region 100 in a typical liquid crystal display. Consequently, these projection patterns are formed by the use of materials that is contained in the typical liquid crystal display. Moreover, the projection patterns are formed at the same time as already-existing components included in the display region 100 through steps of forming films that form these components and patterning steps. This eliminates the need to prepare a particular material and eliminates an increase in manufacturing cost due to an increase in process step. Moreover, such a configuration achieves the following effects: display manufacture involves no process that is practically difficult to be employed; and the uneven surfaces are provided with steps that are effective to an increase in adhesion on the order of 1 to 3 μm.

The liquid crystal display according to the fifth preferred embodiment is configured in the following manner. Arranged in the outer edge portion of the sealant 133 are the projection patterns (i.e., the projection patterns 135*b* and the projection patterns 135*k*) that have smaller outer sizes than the projection patterns 135*a* in the formation region 112A of the alignment film 112 and then the projection patterns 135*b* in the formation region 122A of the alignment film 122. Also arranged in the outer edge portion of the sealant 133 are a plurality of different projection patterns (i.e., the projection patterns 135*m* and the projection patterns 135*n*) that are arranged in lower density than the projection patterns 135*a* and the projection patterns 135*b*. Such a configuration minimizes a reduction in region in the outer edge portion of the sealant 133, in which the sealant 133 is joined to the surfaces of the individual substrates without the alignment film 112 and the alignment film 122 interposed therebetween. Further, the liquid crystal display according to the fifth preferred embodiment is configured such that the uneven surfaces are formed on the surfaces of the individual substrates in the outer edge portion of the sealant 133. Such a configuration enhances the adhesion of the sealant 133 in the above region.

The liquid crystal display according to the second modification of the fifth preferred embodiment is configured such that the projection patterns 135*m* and 135*n* in the outer edge portion of the sealant 133, when viewed as protrusions on the surfaces of the array substrate 110 and the CF substrate 120, are arranged in a staggered manner. Accordingly, in this portion, the sealant 133 is disposed in a complex gap between each projection pattern 135*m* and each projection pattern 135*n*. This further improves a joining strength between the sealant 133, and each of the array substrate 110 and the CF substrate 120. The projection patterns 135*b* and 135*k* in the outer edge portion of the sealant 133 are arranged in such a manner as suggested in the first modification; that is, the projection patterns 135*k* on the CF substrate 120 and the projection patterns 135*h* on the array substrate 110 are arranged in a staggered manner. Such an arrangement similarly improves the joining strength between the sealant 133, and each of the array substrate 110 and the CF substrate 120.

It is to be noted that the present invention is not limited to the aforementioned configurations in the first to fifth preferred embodiments and in the modifications thereof as well as the configurations including suggested modifications, and that some of the configurations can be changed to publicly known configurations, as necessary, without departing from the scope of the invention. It is also to be noted that the individual configurations in the first to fifth preferred embodiments and in the modifications thereof as well as the configurations including suggested modifications can be applied in combination unless otherwise contradicted, and that these different configurations achieve different effects or combined effects.

In some embodiments, uneven portions are formed on the individual substrates in separate manners that are suitable for the formation. The following provides one example of the formation of the uneven portions on the individual substrates. The CF substrate 120 may be provided with circular patterns that are suitable for being formed at the same time as the sub-spacers 134*s* and are made of the same material and have the same thickness as the sub-spacers 134*s*. The array substrate 110 may be provided with recess patterns arranged on the insulating film 115, which is a flattening film, where the recess patterns are suitable for being formed at the same time as the insulating film 115 through a process of forming contact holes by making openings on the insulating film 115 in order to connect the TFTs 114 on the insulating film 115 to the pixel electrodes 113, where the recess patterns each have, for instance, a rectangular shape. As such, simple design and efficient use of members are achieved. This enables the uneven portions of the present invention to be provided at low cost.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
   an array substrate comprising a display region in which an image is displayed, and comprising a transparent substrate on which switching elements and pixel electrodes are arranged in array within the display region;
   a counter substrate provided to face the array substrate with a liquid crystal layer interposed therebetween;
   a sealant provided to surround an outside of the display region, and joining the array substrate to the counter substrate;
   alignment films disposed on a surface of the array substrate and a surface of the counter substrate, the surfaces facing each other; and the liquid crystal layer surrounded by the sealant, and held in a region in a gap between the array substrate and the counter substrate, the region corresponding at least to the display region, wherein the alignment films are disposed at least in the display region, and each of the alignment films is positioned to comprise an overlap with a part of an inside of the sealant, on each of the surfaces of the array substrate and the counter substrate in the overlaps, an uneven surface on which a projection pattern or a recess pattern is arranged, all over an outer edge portion of the sealant, a portion is disposed in which the sealant is joined to the surfaces of the array substrate and the counter substrate without the alignment films interposed therebetween, and in the outer edge portion of the sealant on the array substrate, in a direction from the display region to a region where the sealant is provided, the sealant directly contacts the transparent substrate inside a recess and outside that recess of the recess pattern or directly contacts the substrate at a base of at least one of the projections of the projection pattern at adjacent opposite sides of that projection, the transparent substrate being the same material exposed at the bottom and outside of the recess or at the opposite sides of the base of at least one projection.

2. The liquid crystal display according to claim 1, comprising:

in the display region, a flattening film disposed on the array substrate and covering the switching element; and in the display region, a plurality of columnar spacers disposed on the counter substrate, abutting the array substrate, and holding a gap between the array substrate and the counter substrate, wherein the projection pattern or the recess pattern on the array substrate is made of the same material and has the same thickness as the flattening film, and the projection pattern or the recess pattern on the counter substrate is made of the same material and has the same thickness as the columnar spacers.

3. The liquid crystal display according to claim 2, wherein the plurality of columnar spacers comprise a main spacer and a sub-spacer, the main spacer has a relatively longer length than the sub-spacer in a direction perpendicular to the surface of the counter substrate, the sub-spacer has a relatively shorter length than the main spacer in the direction perpendicular to the surface of the counter substrate, the projection pattern or the recess pattern on the array substrate is made of the same material and has the same thickness as the flattening film, and the projection pattern or the recess pattern on the counter substrate is made of the same material and has the same thickness as the sub-spacer.

4. The liquid crystal display according to claim 1, wherein the sealant is in direct contact with an upper surface of a protrusion of the uneven surface.

5. The liquid crystal display according to claim 3, wherein the sealant is in contact with an upper surface of a protrusion of the uneven surface with the alignment film, being thinner than the alignment film disposed on an upper surface of the sub-spacer, interposed therebetween.

6. The liquid crystal display according to claim 4, wherein the projection pattern or the recess pattern is made of a porous material.

7. The liquid crystal display according to claim 1, wherein a protrusion of the uneven surface disposed on the surface of the array substrate and a protrusion of the uneven surface disposed on the counter substrate are arranged in a staggered manner.

8. The liquid crystal display according to claim 1, wherein
the uneven surface comprises a projection pattern arranged on the surface of each of the array substrate and the counter substrate, the uneven surface further comprises a different projection pattern arranged on the surface of each of the array substrate and the counter substrate, in the portion, in which the sealant is joined to the surfaces of the array substrate and the counter substrate without the alignment films interposed therebetween, and the different projection pattern is arranged in lower density than the projection pattern arranged in the overlap, or the different projection pattern has a smaller outer size than the projection pattern arranged in the overlap.

9. The liquid crystal display according to claim 8, wherein the projection pattern disposed on the surface of the array substrate and the projection pattern on the surface of the counter substrate, in the outer edge portion of the sealant, comprise a protrusion on the surfaces of the array substrate and a protrusion on the counter substrate arranged in a staggered manner.

10. The liquid crystal display according to claim 1, wherein the projection pattern or the recess pattern is formed of a rectangular pattern having a longer-side direction parallel to a direction in which the sealant extends.

11. The liquid crystal display according to claim 3, wherein
the projection pattern or the recess pattern disposed on the array substrate is formed of the recess pattern disposed on the flattening film, and the projection pattern or the recess pattern disposed on the counter substrate is formed of the projection pattern that is circular, is made of the same material, and has the same thickness as the sub-spacer.

12. A liquid crystal display comprising:

an array substrate comprising a display region in which an image is displayed, and comprising a switching element and a pixel electrode arranged in array within the display region;

a counter substrate provided to face the array substrate with a liquid crystal layer interposed therebetween;

a sealant provided to surround an outside of the display region, and joining the array substrate to the counter substrate;

alignment films disposed on a surface of the array substrate and a surface of the counter substrate, the surfaces facing each other; and the liquid crystal layer surrounded by the sealant, and held in a region in a gap between the array substrate and the counter substrate, the region corresponding at least to the display region, wherein the alignment films are disposed at least in the display region, and each of the alignment films is positioned to comprise an overlap with a part of an inside of the sealant, on each of the surfaces of the array substrate and the counter substrate in the overlaps, an uneven surface on which a projection pattern or a recess pattern is arranged, all over an outer edge portion of the sealant, a portion is disposed in which the sealant is joined to the surfaces of the array substrate and the counter substrate without the alignment films interposed therebetween, the projection pattern or the recess pattern comprises a rectangular pattern having a longer-side direction parallel to a direction in which the sealant extends in a vicinity of the sealant on one pair of parallel sides of four sides of the counter substrate that has a rectangular shape, and the projection pattern or the recess pattern comprises a rectangular pattern having a longer-side direction perpendicular to the direction, in which the sealant extends, in a vicinity of the sealant on the other pair of parallel sides of the four sides.

13. The liquid crystal display according to claim 12, wherein the sealant is in direct contact with a bottom of a cavity of the uneven surface.

14. A method for manufacturing the liquid crystal display according to claim 12, the method comprising:

forming, by the use of a rectangular pattern, the projection pattern or the recess pattern in all regions in which the sealant is formed, the rectangular pattern having a longer-side direction perpendicular to a particular direction, the all regions being located on the four sides of the counter substrate, which has a rectangular shape; and moving, by the use of a flexography method, a transfer roller in the particular direction on the surface of the array substrate and on the surface of the counter substrate to apply, onto the surfaces, an alignment film material that forms the alignment films.

15. A method for manufacturing a liquid crystal display comprising an array substrate comprising a display region in which an image is displayed, and comprising a switching element and a pixel electrode arranged in array within the display region; a counter substrate provided to face the array substrate with a liquid crystal layer interposed therebetween; a sealant provided to surround an outside of the display region, and joining the array substrate to the counter substrate; alignment films disposed on a surface of the array substrate and a surface of the counter substrate, the surfaces facing each other; and the liquid crystal layer surrounded by the sealant, and held in a region in a gap between the array substrate and the counter substrate, the region corresponding at least to the display region, wherein the alignment films are disposed at least in the display region, and each of the alignment films is positioned to comprise an overlap with a part of an inside of the sealant, on each of the surfaces of the array substrate and the counter substrate in the overlaps, an uneven surface on which a projection pattern or a recess pattern is arranged, and all over an outer edge portion of the sealant, a portion is disposed in which the sealant is joined to the surfaces of the array substrate and the counter substrate without the alignment films interposed therebetween, the method comprising:

applying and forming a flattening film that covers the switching element onto the surface of the array substrate;

patterning the flattening film to simultaneously form, onto the array substrate, a contact hole disposed on the flattening film in the display region and the projection pattern or the recess pattern disposed in the overlap;

applying and forming a photosensitive resin film onto the surface of the counter substrate; and patterning the photosensitive resin film to simultaneously form, onto the counter substrate, a plurality of columnar spacers disposed in the display region and the projection pattern or the recess pattern disposed in the overlap.

16. A method for manufacturing a liquid crystal display comprising an array substrate comprising a display region in which an image is displayed, and comprising a switching element and a pixel electrode arranged in array within the display region; a counter substrate provided to face the array substrate with a liquid crystal layer interposed therebetween; a sealant provided to surround an outside of the display region, and joining the array substrate to the counter substrate; alignment films disposed on a surface of the array substrate and a surface of the counter substrate, the surfaces facing each other; and the liquid crystal layer surrounded by the sealant, and held in a region in a gap between the array substrate and the counter substrate, the region corresponding at least to the display region, wherein the alignment films are disposed at least in the display region, and each of the alignment films is positioned to comprise an overlap with a part of an inside of the sealant, on each of the surfaces of the array substrate and the counter substrate in the overlaps, an uneven surface on which a projection pattern or a recess pattern is arranged, and all over an outer edge portion of the sealant, a portion is disposed in which the sealant is joined to the surfaces of the array substrate and the counter substrate without the alignment films interposed therebetween, the method comprising:

applying an alignment film material that forms the alignment films onto the surfaces of the array substrate and the counter substrate; and rubbing a surface of the alignment film material with a mask that covers the display region to reduce a thickness of the alignment film material applied on an upper surface of a protrusion of the uneven surface.

17. The liquid crystal display according to claim 1, wherein in the outer edge portion of the sealant on the array substrate, in a direction from the display region to a region where the sealant is provided, the sealant directly contacts the transparent substrate without an intervening alignment film inside a recess and outside that recess of the recess pattern or directly contacts the substrate without an intervening alignment film at a base of at least one of the projections of the projection pattern at adjacent opposite sides of that projection, the transparent substrate being the same material exposed at the bottom and outside of the recess or at the opposite sides of the base of at least one projection.

* * * * *